US012542226B2

(12) United States Patent
Yakata

(10) Patent No.: US 12,542,226 B2
(45) **Date of Patent: *Feb. 3, 2026**

(54) RESISTOR

(71) Applicant: ROHM CO., LTD., Kyoto (JP)

(72) Inventor: Atsuki Yakata, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 191 days.

This patent is subject to a terminal disclaimer.

(21) Appl. No.: 18/475,919

(22) Filed: Sep. 27, 2023

(65) Prior Publication Data

US 2024/0021345 A1 Jan. 18, 2024

Related U.S. Application Data

(63) Continuation of application No. 17/606,612, filed as application No. PCT/JP2020/018648 on May 8, 2020, now Pat. No. 11,810,697.

(30) Foreign Application Priority Data

May 15, 2019 (JP) ................................ 2019-092140

(51) Int. Cl.
*H01C 1/142* (2006.01)
*H01C 1/032* (2006.01)
*H01C 17/242* (2006.01)

(52) U.S. Cl.
CPC ............. *H01C 1/142* (2013.01); *H01C 1/032* (2013.01); *H01C 17/242* (2013.01)

(58) Field of Classification Search
CPC ....... H01C 1/142; H01C 1/032; H01C 17/242
See application file for complete search history.

(56) References Cited

U.S. PATENT DOCUMENTS 4,705,713 A 11/1987 Ohta et al.
5,248,852 A 9/1993 Kumagi (Continued)

FOREIGN PATENT DOCUMENTS

JP 61-188901 A 8/1986
JP 61-240603 A 10/1986

(Continued)

OTHER PUBLICATIONS

Office Action received in corresponding Japanese Patent application No. 2021-519408, May 7, 2024, and English translation (13 pages).

(Continued)

*Primary Examiner* — Kyung S Lee
(74) *Attorney, Agent, or Firm* — HSML P.C.

(57) ABSTRACT

A resistor includes a resistive element including a first surface and a second surface facing opposite sides in a thickness direction; a protective film having electrical insulating properties disposed on the first surface; and a pair of electrodes disposed spaced apart from each other in a first direction perpendicular to the thickness direction, the pair of electrodes being configured to come into contact with the resistive element. The protective film includes a first outer edge and a second outer edge spaced apart from each other in the first direction and extending in a second direction perpendicular to both the thickness direction and the first direction. The resistive element includes a first slit and a second slit extending from the first surface through to the second surface and extending in the second direction. The first slit is located closest to the first outer edge; and the second slit is located closest to the second outer edge. As viewed in the thickness direction, a first distance from the first outer edge to the first slit and a second distance from the second outer edge to the second slit together have a length (Continued)

15% or greater of a dimension of the protective film in the first direction.

16 Claims, 25 Drawing Sheets

(56) References Cited

U.S. PATENT DOCUMENTS

| | | | | |
|---|---|---|---|---|
| 8,310,334 | B2 * | 11/2012 | Chen | H01C 17/02 338/307 |
| 9,035,740 | B2 | 5/2015 | Washizaki et al. | |
| 9,704,621 | B2 | 7/2017 | Ogawa et al. | |
| 9,911,524 | B2 | 3/2018 | Tanaka et al. | |
| 11,810,697 | B2 * | 11/2023 | Yakata | H01C 1/032 |
| 2016/0240291 | A1 | 8/2016 | Tanaka et al. | |

FOREIGN PATENT DOCUMENTS

| | | | |
|---|---|---|---|
| JP | 1987-124701 | A | 8/1988 |
| JP | 2002-246211 | A | 8/2002 |
| JP | 2005-277019 | A | 10/2005 |
| JP | 2008-10895 | A | 1/2008 |
| JP | 2008-512872 | A | 4/2008 |
| JP | 2013-225602 | A | 10/2013 |
| JP | 2015-19023 | A | 1/2015 |
| JP | 2016-152301 | A | 8/2016 |

OTHER PUBLICATIONS

Decision of Refusal received in corresponding Japanese Patent application No. 2021-519408, Aug. 6, 2024. and machine translation (8 pages).
Chinese Office Action received in the corresponding Chinese Patent application, Apr. 29, 2023, and machine translation (15 pages).
Office Action received in the corresponding Chinese Patent application, Oct. 20, 2022, and machine translation (14 pages).
International Search Report issued in PCT/JP2020/018648, Aug. 11, 2020 (3 pages).

* cited by examiner

RESISTOR

TECHNICAL FIELD

The present disclosure relates to a resistor mainly used in current detection.

BACKGROUND ART

A known resistor is provided with a resistive element made of a metal plate. Such a resistor is mainly used in current detection. In Patent Document 1, an example is described of a resistor provided with a resistive element made of a metal plate. This resistor is provided with a resistive element and a pair of electrodes formed on the ends of a surface of the resistive element facing one direction in a thickness direction.

There is a need for resistors provided with a resistive element made of a metal plate to have a lower resistance value in order to improve the accuracy of current detection. However, as described in Patent Document 1, the resistive element is provided with a slit for adjusting the resistance value of the resistor. In this case, when a slit is provided near either one of the pair of electrodes of the resistor, the value of the temperature coefficient of resistance (TCR) is confirmed to be relatively higher. Also, it is confirmed that there is a tendency for the value of the temperature coefficient of resistance to rise further when the resistance value of the resistor is low. With high values for the temperature coefficient of resistance, variation increases in the resistance value of the resistor caused by heat generated from the resistive element when the resistor is in use. This causes the accuracy of the current detection using the resistor to be reduced. Accordingly, there is a need to suppress an increase of the temperature coefficient of resistance in a resistor provided with a resistive element including a slit.

PRIOR ART DOCUMENTS

Patent Document

Patent Document 1: JP-A-2013-225602

SUMMARY OF THE INVENTION

Problem to be Solved by the Invention

In light of the foregoing, the present disclosure is directed at providing a resistor that enables an increase in temperature coefficient of resistance to be suppressed.

Means for Solving the Problem

A resistor provided according to an aspect of the present disclosure includes: a resistive element including a first surface and a second surface facing opposite sides in a thickness direction; a protective film disposed on the first surface and having electrical insulating properties; and a pair of electrodes spaced apart from each other in a first direction perpendicular to the thickness direction, where the pair of electrodes are held in contact with the resistive element. The protective film includes a first outer edge and a second outer edge that are spaced apart from each other in the first direction and each extend in a second direction perpendicular to the thickness direction and the first direction. The resistive element includes a first slit and a second slit each extending from the first surface through to the second surface and extending in the second direction. The first slit is located closest to the first outer edge, and the second slit is located closest to the second outer edge. As viewed in the thickness direction, a first distance between the first outer edge and the first slit and a second distance between the second outer edge and the second slit together have a length 15% or greater of a dimension of the protective film in the first direction.

Preferably, as viewed in the thickness direction, the first distance and the second distance are equal to each other.

Preferably, each one of the pair of electrodes includes a bottom portion opposite to the resistive element with respect to the protective film in the thickness direction. The bottom portion of each one of the pair of electrodes includes a portion overlapping with a portion of the protective film as viewed in the thickness direction.

Preferably, the protective film is made of a material including a synthetic resin.

Preferably, the protective film includes a filler made of a material including a ceramic.

Preferably, the first slit overlaps with the bottom portion of one of the pair of electrodes as viewed in the thickness direction. The second slit overlaps with the bottom portion of the other one of the pair of electrodes as viewed in the thickness direction.

Preferably, as viewed in the thickness direction, the first distance and the second distance together have a length 30% or less of the dimension of the protective film in the first direction.

Preferably, the resistive element includes a pair of first end surfaces spaced apart from each other in the first direction and connected to both the first surface and the second surface. Each one of the pair of electrodes includes a side portion jutting out in the thickness direction and connected to the bottom portion of one of the pair of electrodes. The side portion of each one of the pair of electrodes is in contact with one of the pair of first end surfaces.

Preferably, the resistor further includes an insulating plate disposed on the second surface and made of a material including a synthetic resin. The resistive element includes a pair of second end surfaces spaced apart from each other in the second direction and connected to both the first surface and the second surface; and the pair of second end surfaces are covered by the insulating plate.

Preferably, the side portions of the pair of electrodes are in contact with the insulating plate.

Preferably, the first slit extends in the second direction from one surface of the pair of second end surfaces. The second slit extends in the second direction from the other surface of the pair of second end surfaces.

Preferably, the insulating plate includes a portion extending into the first slit and the second slit in the thickness direction.

Preferably, the first slit and the second slit each include a pair of side walls spaced apart from each other in the first direction, where each one of the pair of side walls includes a portion recessed in the first direction.

Preferably, the resistive element includes a projection projecting in the second direction from one of the pair of second end surfaces, where the projection is connected to one of the pair of first end surfaces. The bottom portion of one of the pair of electrodes is in contact with the projection.

Preferably, the resistive element includes a plurality of grooves recessed in the first surface and each extending in a predetermined direction. The protective film meshes with the plurality of grooves.

Preferably, the resistor further includes a pair of intermediate layers located between the resistive element and the bottom portion of the pair of electrodes in the thickness direction. Each one of the pair of intermediate layers includes a cover portion covering a portion of the protective film. The bottom portion of each one of the pair of electrodes is in contact with the cover portion of one of the pair of intermediate layers.

Preferably, the first outer edge and the second outer edge are located between the pair of first end surfaces as viewed in the thickness direction. The first surface includes a first region and a second region not covered by any one of the protective film and the pair of intermediate layers. The first region is located between the first outer edge and one of the pair of first end surfaces located closest to the first outer edge. The second region is located between the second outer edge and one of the pair of first end surfaces located closest to the second outer edge. Each of the first region and the second region are in contact with the bottom portion of one of the pair of electrodes.

According to the above-described configurations of the resistor, an increase in the temperature coefficient of resistance can be suppressed.

Other features and advantages of the present disclosure will be apparent from the following detailed description with reference to the attached diagrams.

MODE FOR CARRYING OUT THE INVENTION

Various embodiments of the present disclosure are described below with reference to the attached drawings.

Figure 4:
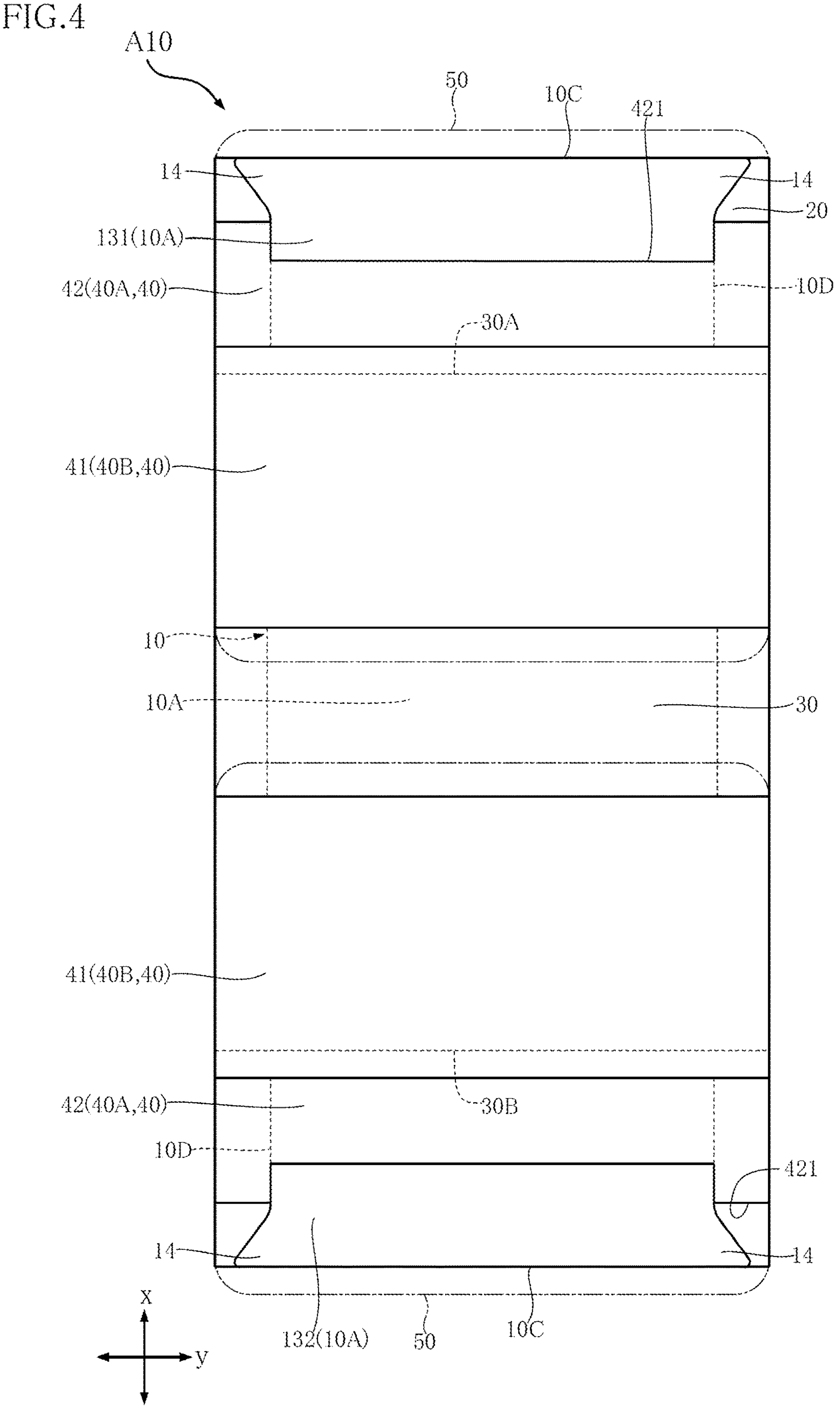
FIG. 4 is a bottom view corresponding to FIG. 3, with a pair of electrodes made transparent.
Figure 5:
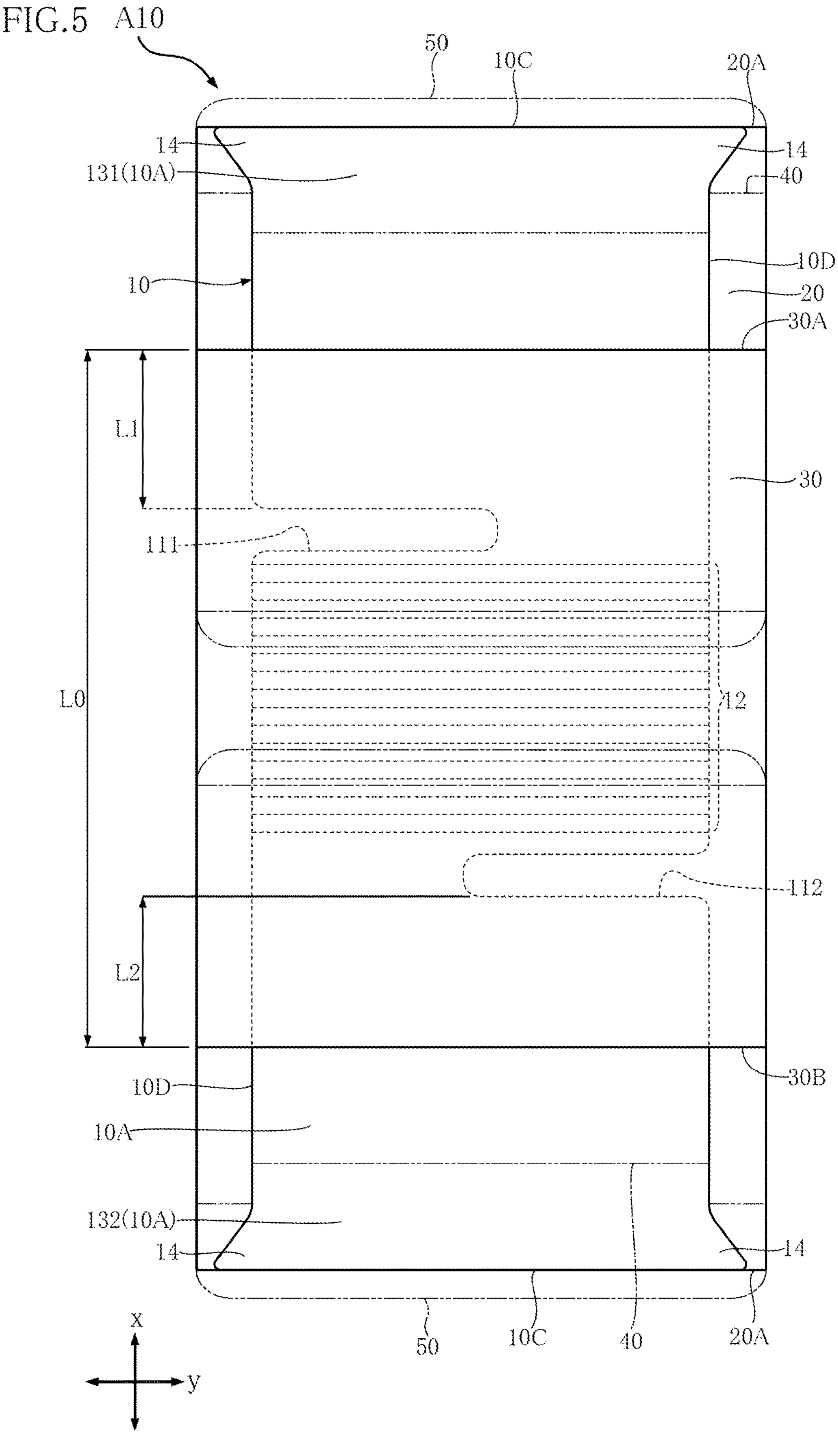
FIG. 5 is a bottom view corresponding to FIG. 4, with a pair of intermediate layers made transparent.

A resistor A10 according to a first embodiment will now be described with reference to FIGS. 1 to 11. The resistor A10 is an example of a shunt resistor used in current detection. The resistor A10 has a main resistance value of 5 mΩ. The resistor A10 may be surface mounted on a circuit board of various electronic devices. The resistor A10 is provided with a resistive element 10, an insulating plate 20, a protective film 30, a pair of intermediate layers 40, and a pair of electrodes 50. Note that in FIG. 2, to facilitate understanding, the insulating plate 20 is shown as being transparent. In FIG. 4, to facilitate understanding, the pair of electrodes 50 are shown as being transparent. In FIG. 5, the pair of intermediate layers 40 and the pair of electrodes 50 are shown as being transparent. In these diagrams, the transparent pair of intermediate layers 40 and the pair of electrodes 50 are indicated by an imaginary line (two-dot chain line).

Figure 1:
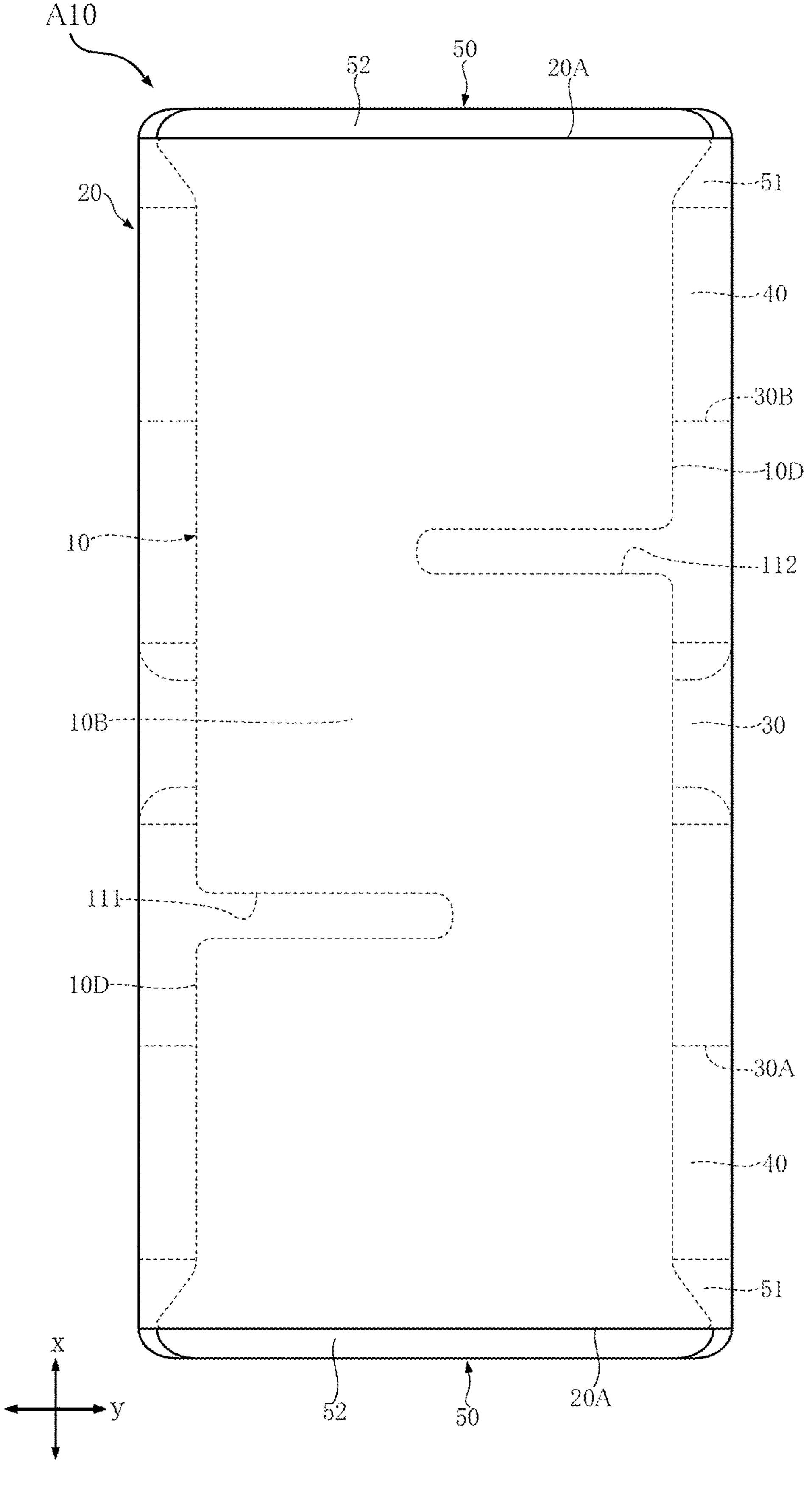
FIG. 1 is a plan view of a resistor according to a first embodiment.

In the description of the resistor A10, the direction along the thickness of the resistive element 10 is referred to as "thickness direction z". A direction perpendicular to the thickness direction z is referred to as "first direction x". A direction perpendicular to both the thickness direction z and the first direction x is referred to as "second direction y". The "thickness direction z", the "first direction x", and the "second direction y" are also used in describing a resistor A20 described below. As illustrated in FIG. 1, the resistor A10 is rectangular as viewed in the thickness direction z. The first direction x corresponds to the length direction of the resistor A10. The second direction y corresponds to the width direction of the resistor A10.

The resistive element 10 forms the functional core of the resistor A10. The resistive element 10 is a metal plate. The material of the metal plate may be, for example, an alloy of copper (Cu), manganese (Mn), and nickel (Ni) (Manganin (registered trademark)) or an alloy of copper, manganese, and tin (Sn) (ZERANIN (registered trademark)). The thickness of the resistive element 10 ranges from 50 μm to 150 μm.

Figure 7:
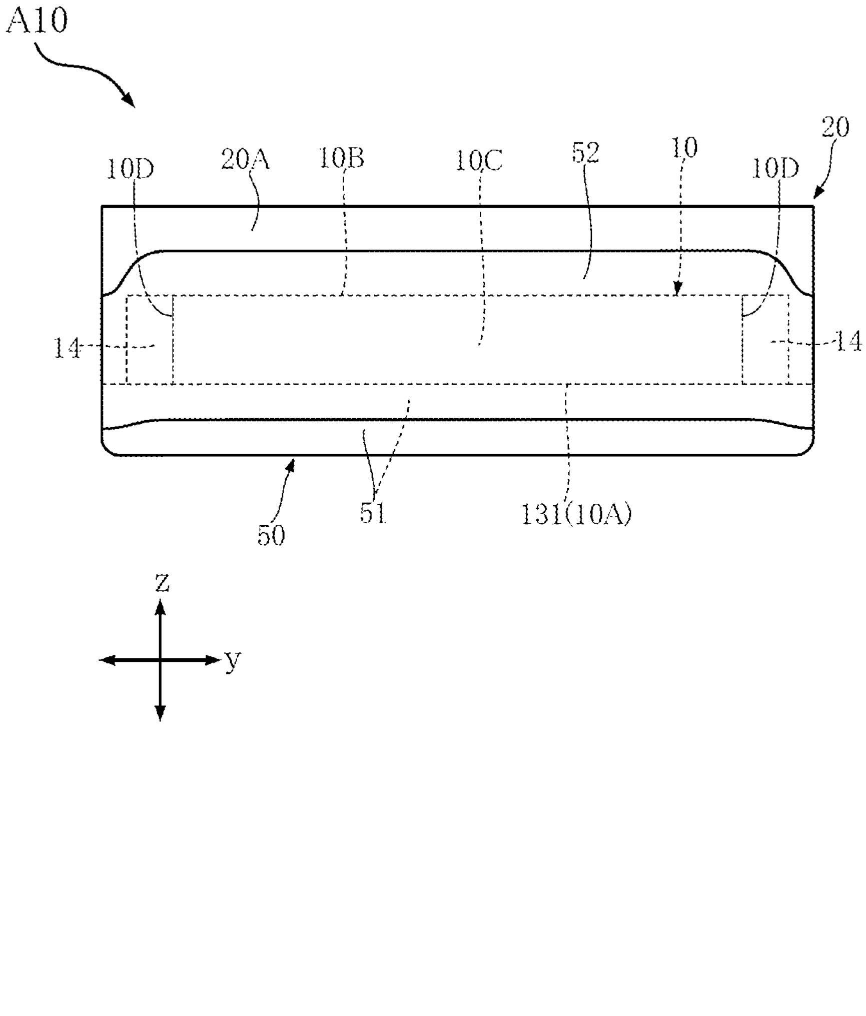
FIG. 7 is a front view of the resistor illustrated in FIG. 1.
Figure 8:
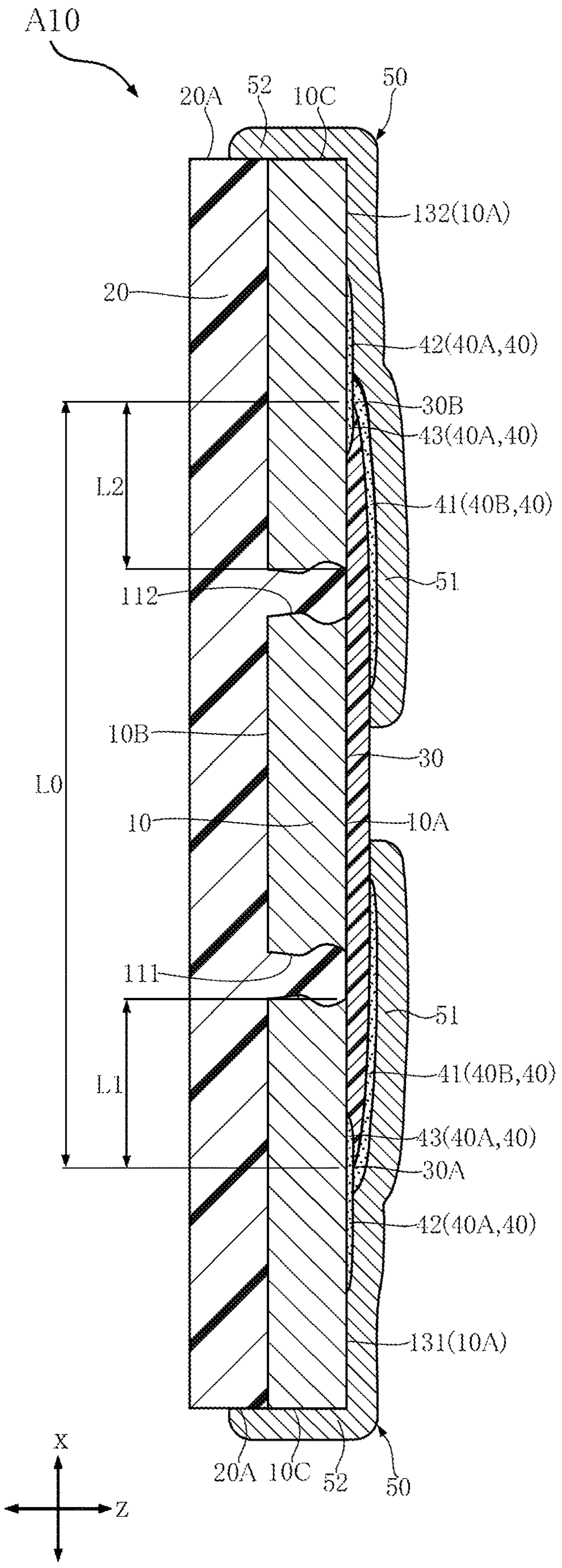
FIG. 8 is a cross-sectional view taken along line VIII-VIII of FIG. 2.

As illustrated in FIGS. 7 and 8, the resistive element 10 includes a first surface 10A, a second surface 10B, a pair of first end surfaces 10C, and a pair of second end surfaces 10D. The first surface 10A faces one direction in the thickness direction z. The second surface 10B facing the opposite direction to the first surface 10A. Thus, the first surface 10A and the second surface 10B face opposite sides in the thickness direction z. The pair of first end surfaces 10C are spaced apart from each other in the first direction x. Each one of the pair of first end surfaces 10C is connected to both the first surface 10A and the second surface 10B. The pair of second end surfaces 10D are spaced apart from each other in the second direction y. Each one of the pair of second end surfaces 10D is connected to both the first surface 10A and the second surface 10B.

As illustrated in FIGS. 2 to 8, the resistive element 10 includes a first slit 111 and a second slit 112. The first slit 111 and the second slit 112 are provided for adjusting the resistance value of the resistive element 10 to a predetermined value. The first slit 111 and the second slit 112 are spaced apart from each other in the first direction x. The first slit 111 and the second slit 112 extend through the resistive element 10 from the first surface 10A toward the second surface 10B. The first slit 111 extends in the second direction y from one surface of the pair of second end surfaces 10D. The second slit 112 extends in the second direction y from the other surface of the pair of second end surfaces 10D.

Figure 9:
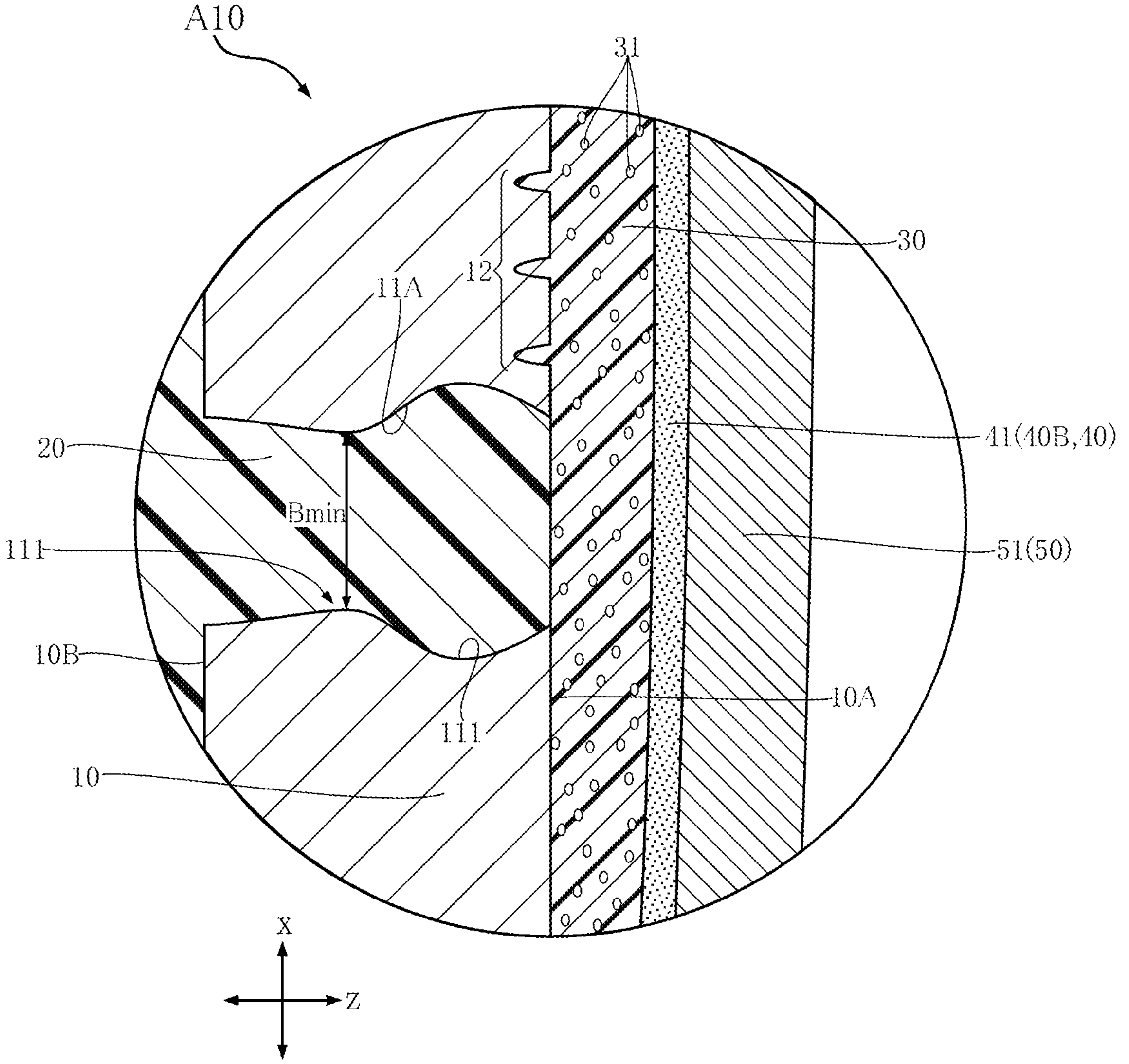
FIG. 9 is an enlarged view of a portion of FIG. 8.

As illustrated in FIG. 9, the first slit 111 includes a pair of side walls 11A. Note that, though omitted from the drawings, the second slit 112 also includes a pair of side walls 11A in a similar manner to the first slit 111. The pair of side walls 11A are spaced apart from each other in the first direction x. Each one of the pair of side walls 11A is connected to both the first surface 10A and the second surface 10B. Each side wall 11A includes a portion recessed in the first direction x.

Figure 10:
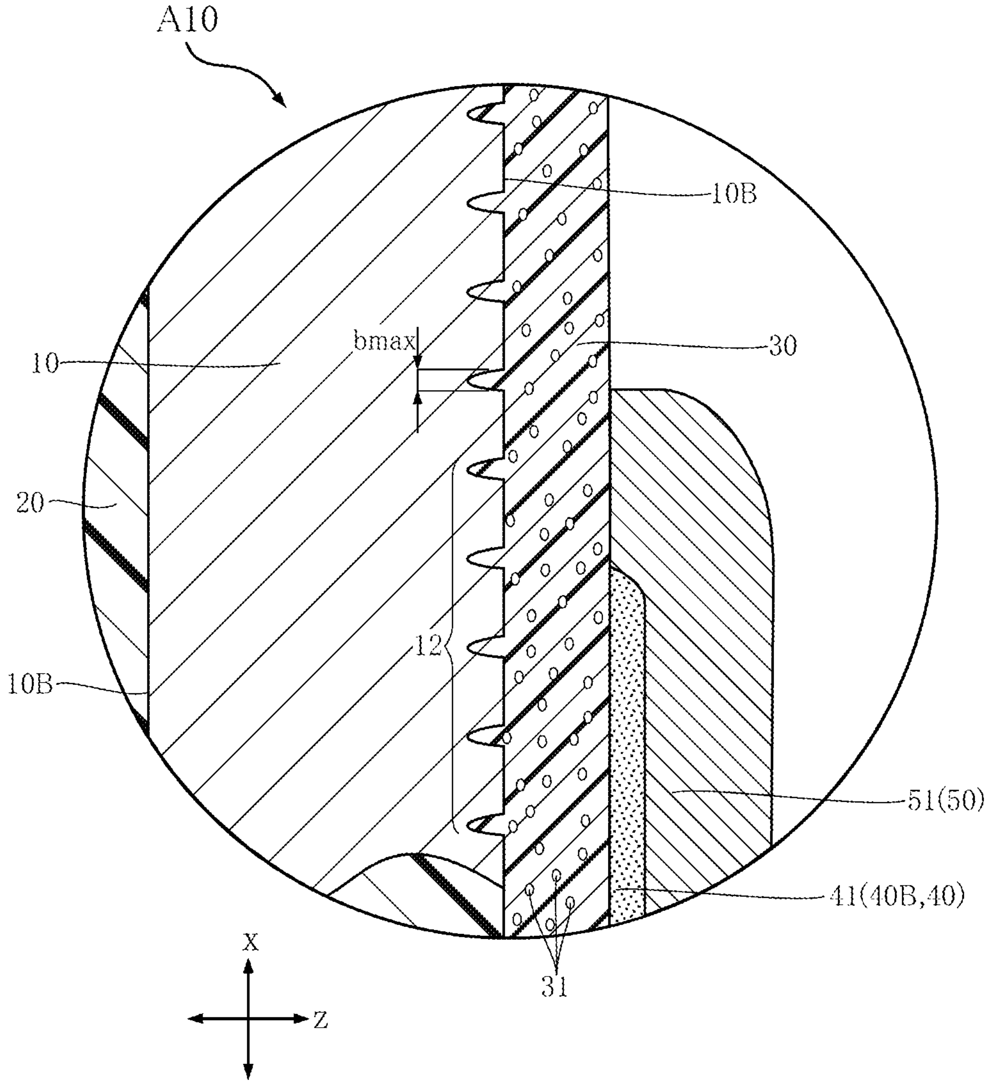
FIG. 10 is an enlarged view of a portion of FIG. 8.

As illustrated in FIGS. 5 and 10, the resistive element 10 is provided with a plurality of grooves 12 for adjusting the resistance value of the resistive element 10 to a predetermined value, together with the first slit 111 and the second slit 112. The plurality of grooves 12 are recessed from the first surface 10A and extend in a predetermined direction. In illustrated example of the resistor A10, the plurality of grooves 12 extend in the second direction y. The plurality of grooves 12 are located between the first slit 111 and the second slit 112 in the first direction x. As illustrated in FIG. 10, a maximum width bmax of the plurality of grooves 12 is less than a minimum width Bmin (see FIG. 9) of the first slit 111 and the second slit 112.

Figure 2:
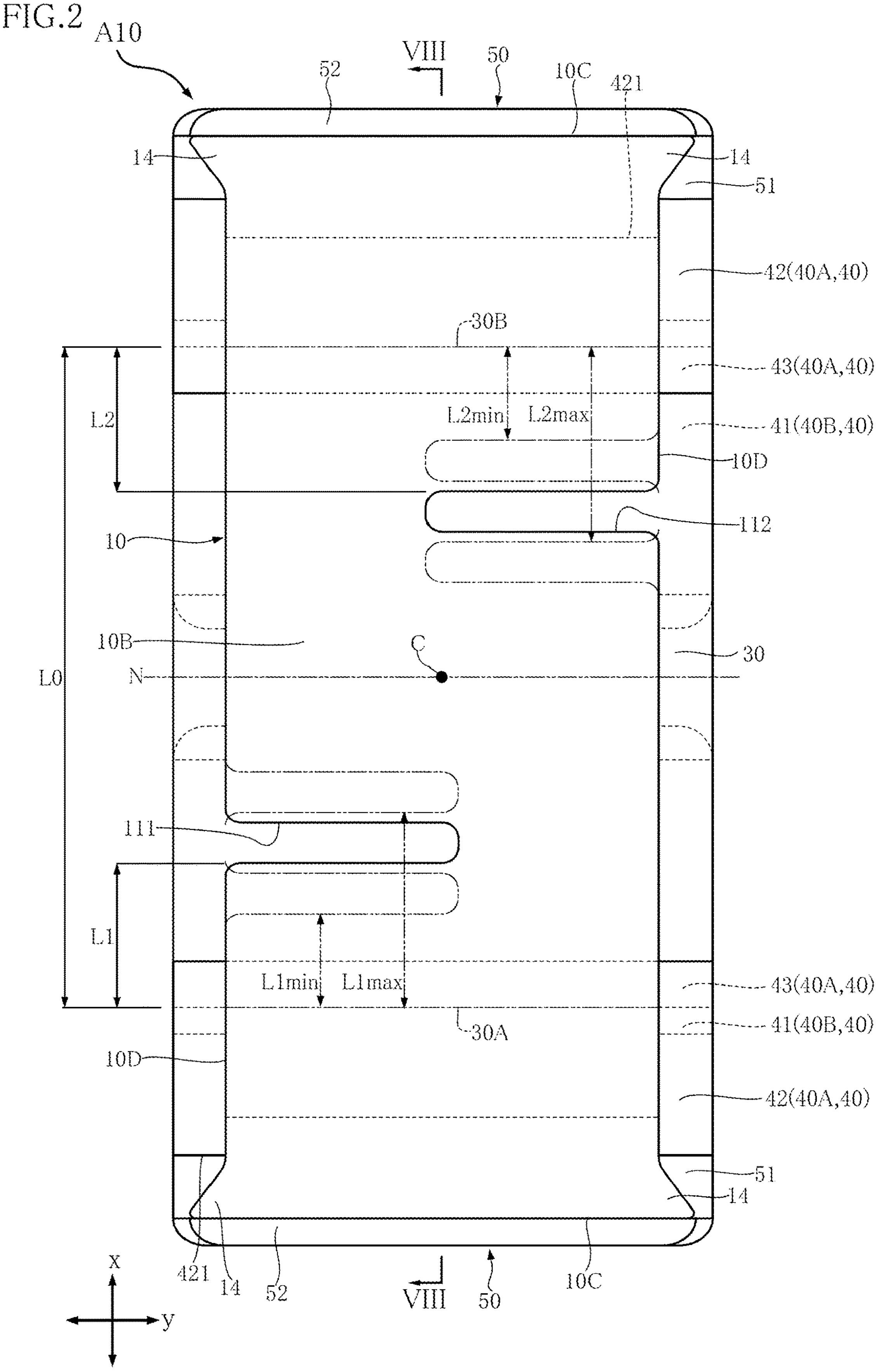
FIG. 2 is a plan view of the resistor illustrated in FIG. 1, with an insulating plate made transparent.
Figure 3:
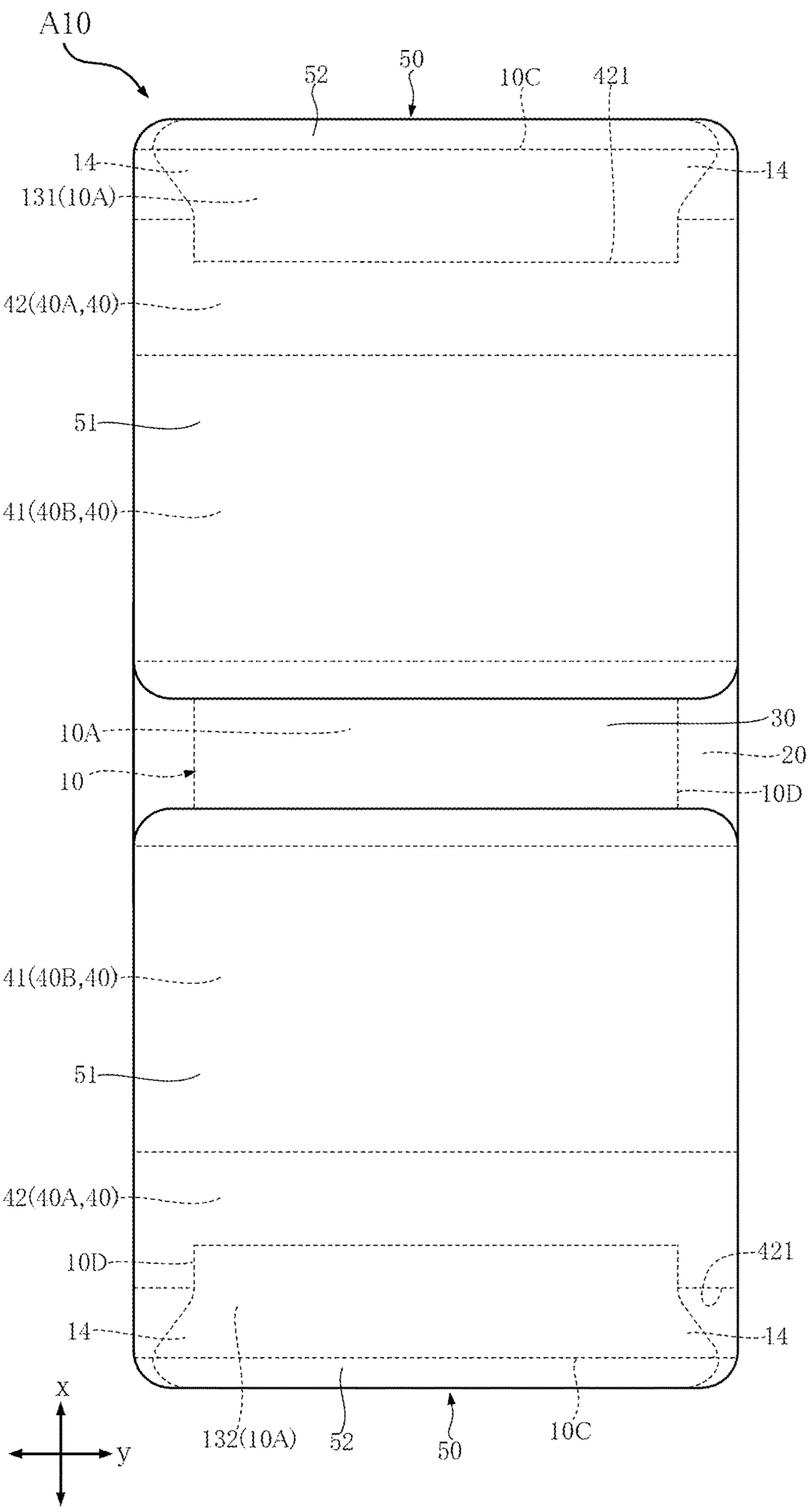
FIG. 3 is a bottom view of the resistor illustrated in FIG. 1.

As illustrated in FIGS. 2, 4, and 7, the resistive element includes four projections 14. As viewed in the thickness direction z, the four projections 14 are located at the four corners of the resistive element 10. The four projections 14 each project in the second direction y from one of the pair of second end surfaces 10D. Each one of the four projections 14 is connected to one of the pair of first end surfaces 10C.

The shape of the resistive element 10 has point symmetry as viewed in the thickness direction z. Point symmetry in this case indicates the point symmetrical relationship with respect to a center C of two divided sections formed by dividing the resistive element 10 into two via a boundary N that passes through the center C of the resistive element 10 illustrated in FIG. 2 and extends in the second direction y.

Figure 6:
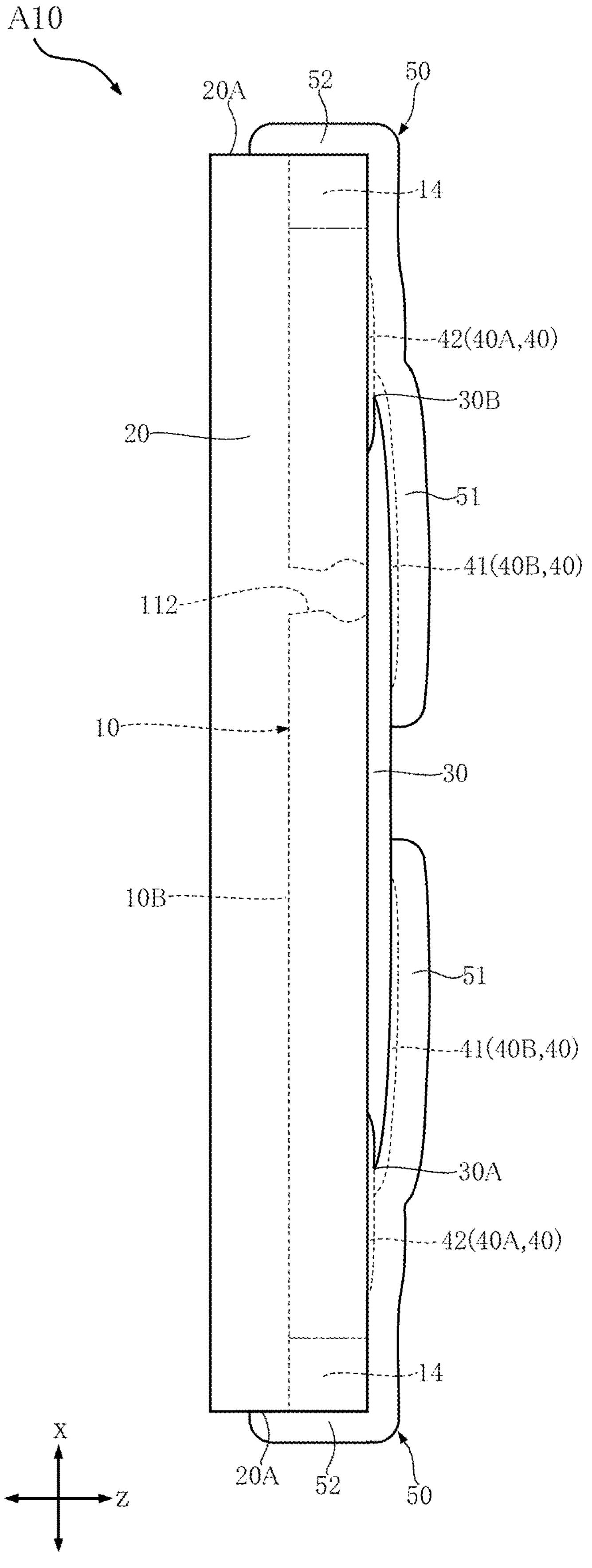
FIG. 6 is a right side view of the resistor illustrated in FIG. 1.

As illustrated in FIG. 8, the insulating plate 20 is disposed on the second surface 10B of the resistive element 10. The insulating plate 20 is made of a material including a synthetic resin. In the illustrated example of the resistor A10, the insulating plate 20 is a synthetic resin sheet including an epoxy resin. As illustrated in FIGS. 1 and 7, the pair of second end surfaces 10D of the resistive element 10 are covered by the insulating plate 20. As illustrated in FIGS. 1, 6, and 8, the insulating plate 20 includes a pair of end surfaces 20A. The pair of end surfaces 20A face opposite sides in the first direction x and are spaced apart from each other in the first direction x. Each one of the pair of end surfaces 20A is flush with one of the pair of first end surfaces 10C. As illustrated in FIG. 8, a portion of the insulating plate 20 is disposed extending through the first slit 111 and the second slit 112 of the resistive element 10 in the thickness direction z.

As illustrated in FIG. 8, the protective film 30 is disposed on the first surface 10A of the resistive element 10. The protective film 30 has electrical insulating properties and is made of a material including a synthetic resin. In the illustrated example of the resistor A10, the protective film 30 is made of a material including an epoxy resin. As illustrated in FIGS. 9 and 10, the protective film 30 includes a filler 31. The filler 31 is made of a material including a ceramic. The ceramic is preferably one with a relatively high thermal conductivity, such as alumina ($Al_2O_3$) or boron nitride (BN). The protective film 30 covers a portion of the first surface 10A and the portion of the insulating plate 20 disposed extending through the first slit 111 and the second slit 112 of the resistive element 10. As illustrated in FIG. 10, the protective film 30 meshes with the plurality of grooves 12 of the resistive element 10.

As illustrated in FIGS. 2, 5, and 8, the protective film 30 includes a first outer edge 30A and a second outer edge 30B. The first outer edge 30A and the second outer edge 30B are spaced apart from each other in the first direction x and extend in the second direction y. The first outer edge 30A is located closest to the first slit 111 of the resistive element 10. The second outer edge 30B is located closest to the second slit 112 of the resistive element 10. As viewed in the thickness direction z, a first distance L1 from the first outer edge 30A to the first slit 111 and a second distance L2 from the second outer edge 30B to the second slit 112 together occupy from 15% to 30% of a dimension L0 of the protective film 30 in the first direction x. The first distance L1 indicates the least distance from the boundary between the pair of side walls 11A of the first slit 111 and the first surface 10A of the resistive element 10 to the first outer edge 30B. In a similar manner, the second distance L2 indicates the least distance from the boundary between the pair of side walls 11A of the second slit 112 and the first surface 10A to the second outer edge 30B. Note that the dimension L0 is equal to the distance from the first outer edge 30A and the second outer edge 30B. As viewed in the thickness direction z, the first distance L1 and the second distance L2 are equal.

In FIG. 2, the first distance L1 and the second distance L2 equal to 15% of the dimension L0 of the protective film 30 in the first direction x are indicated by a first distance L1min and a second distance L2min. Also, the first distance L1 and the second distance L2 equal to 30% of the dimension L0 of the protective film 30 in the first direction x are indicated by a first distance L1max and a second distance L2max.

As illustrated in FIGS. 4, 5, and 8, the first outer edge and the second outer edge 30B of the protective film 30 are located between the pair of first end surfaces 10C of the resistive element 10 as viewed in the thickness direction z. The first surface 10A of the resistive element 10 includes a first region 131 and a second region 132 not covered by the protective film 30 or the pair of intermediate layers 40. The first region 131 is located between the first outer edge 30A and one of the pair of first end surfaces 10C located closest to the first outer edge 30A. The second region 132 is located between the second outer edge 30B and one of the pair of first end surfaces 10C located closest to the second outer edge 30B.

As illustrated in FIG. 8, the pair of intermediate layers 40 are located between the resistive element 10 and a bottom portion 51 (details described below) of the pair of electrodes 50 in the thickness direction z. The pair of intermediate layers 40 are spaced apart from each other in the first direction x. The pair of intermediate layers 40 have electrical conductivity. In the resistor A10, the pair of intermediate layers 40 have electrical conductivity and are made of a material including a synthetic resin. The pair of intermediate layers 40 include metal particles. The metal particles include silver (Ag). In the illustrated example of the resistor A10, the synthetic resin included in the pair of intermediate layers 40 is an epoxy resin. The electric resistivity of the pair of intermediate layers 40 is approximately ten times the electric resistivity of the resistive element 10. Accordingly, the electric resistivity of the pair of intermediate layers 40 is greater than the electric resistivity of the resistive element 10.

As illustrated in FIGS. 4 and 8, each one of the pair of intermediate layers 40 includes a cover portion 41 and an extension portion 42. The cover portion 41 is located on the opposite side of the protective film 30 to the resistive element 10 in the thickness direction z. The cover portion 41 covers a portion of the protective film 30. The extension portion 42 extends from one of the cover portions 41 of the pair of intermediate layers 40 towards one of the pair of first end surfaces 10C of the resistive element 10. The extension portion 42 is in contact with the first surface 10A of the resistive element 10. In this manner, the pair of intermediate layers 40 are electrically connected to the resistive element 10.

As illustrated in FIGS. 2, 4, and 8, each one of the pair of intermediate layers 40 includes a first layer 40A and a second layer 40B. The first layer 40A includes the extension portion 42 and is in contact with the first surface 10A of the resistive element 10. The dimension in the thickness direction z of the first layer 40A is substantially uniform throughout the first layer 40A. The second layer 40B includes the cover portion 41. The second layer 40B is in contact with the first layer 40A of one of the pair of intermediate layers 40. The second layer 40B is configured to cover over a portion of the first layer 40A.

As illustrated in FIG. 4, a cutout 421 is formed in the extension portion 42 of each one of the pair of intermediate layers 40. The cutout 421 is recessed in the first direction x from one of the pair of first end surfaces 10C. The first region 131 and the second region 132 including the pair of projections 14 of the resistive element 10 are exposed from the cutouts 421.

Figure 11:
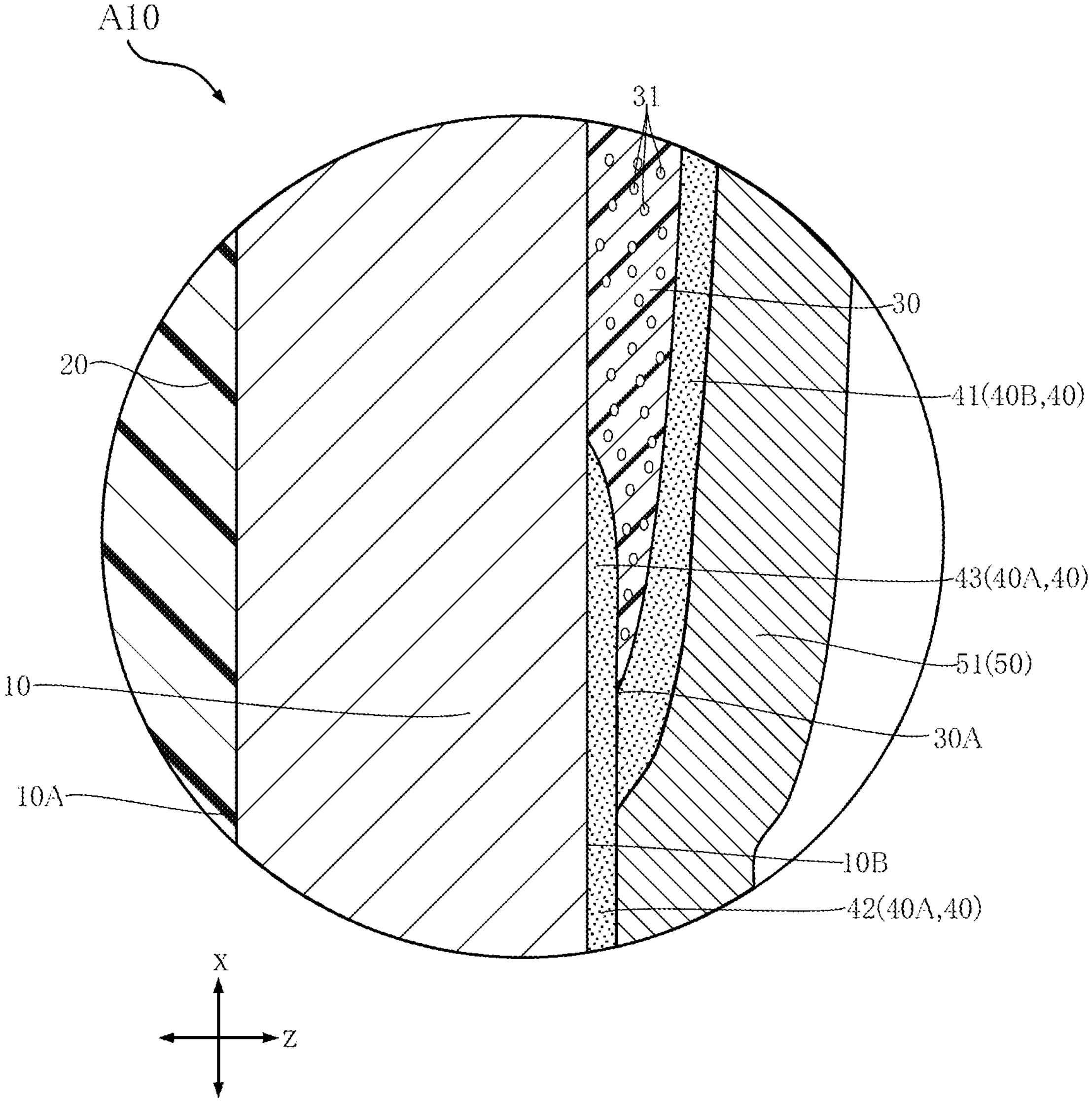
FIG. 11 is an enlarged view of a portion of FIG. 8.

As illustrated in FIG. 11, the first layer 40A of each one of the pair of intermediate layers 40 includes an interposed portion 43 extending from the extension portion 42 toward the protective film 30. The interposed portion 43 includes a portion located between the resistive element 10 and the protective film 30. Accordingly, both ends in the first direction x of the protective film 30 are covered over by the first layers 40A of the pair of intermediate layers 40. The interposed portions 43 are in contact with both the resistive element 10 and the protective film 30.

As illustrated in FIGS. 1 to 3, 6, and 8, the pair of electrodes 50 are disposed spaced apart from each other in the first direction x. Each one of the pair of electrodes 50 is in contact with the resistive element 10. In this manner, the pair of electrodes 50 are electrically connected to the resistive element 10. Each one of the pair of electrodes 50 is formed of a plurality of metal layers. In the illustrated example of the resistor A10, the plurality of metal layers include a copper layer, a nickel layer, and a tin layer stacked in this order from the side closest to the resistive element 10.

As illustrated in FIGS. 3 and 6 to 8, each one of the pair of electrodes 50 includes the bottom portion 51. The bottom portion 51 is located on the opposite side of the protective film to the resistive element 10 in the thickness direction z. The bottom portion 51 of each one of the pair of electrodes 50 includes a portion that overlaps with a portion of the protective film 30 as viewed in the thickness direction z. As illustrated in FIG. 2, the first slit 111 of the resistive element 10 overlaps with the bottom portion 51 of one of the pair of electrodes 50 as viewed in the thickness direction z. Also, the second slit 112 of the resistive element 10 overlaps with the bottom portion 51 of the other one of the pair of electrodes 50 as viewed in the thickness direction z.

As illustrated in FIGS. 6 and 8, the bottom portion 51 of each one of the pair of electrodes 50 is in contact with both the cover portion 41 and the extension portion 42 of one of the pair of intermediate layers 40. Also, as illustrated in FIGS. 7 and 8, the bottom portion 51 of one of the pair of electrodes 50 is in contact with either the first region 131 or the second region 132 of the resistive element 10 and the two projections 14 adjacent to one of the pair of first end surfaces 10C of the resistive element 10.

As illustrated in FIGS. 1 to 3 and 6 to 8, each one of the pair of electrodes 50 includes a side portion 52. The side portion 52 is connected to the bottom portion 51 of one of the pair of electrodes 50 and juts out extending in the thickness direction z. The side portion 52 of each one of the pair of electrodes 50 is in contact with one of the pair of first end surfaces 10C of the resistive element 10. Also, the side portion 52 of each one of the pair of electrodes 50 is in contact with one of the pair of end surfaces 20A of the insulating plate 20.

Next, an example of a method of manufacturing the resistor A10 will be described with reference to FIGS. 12 to 17. Note that the cross-section location illustrated in FIGS. 12 to 17 is the same as the cross-section location illustrated in FIG. 8.

Figure 12:
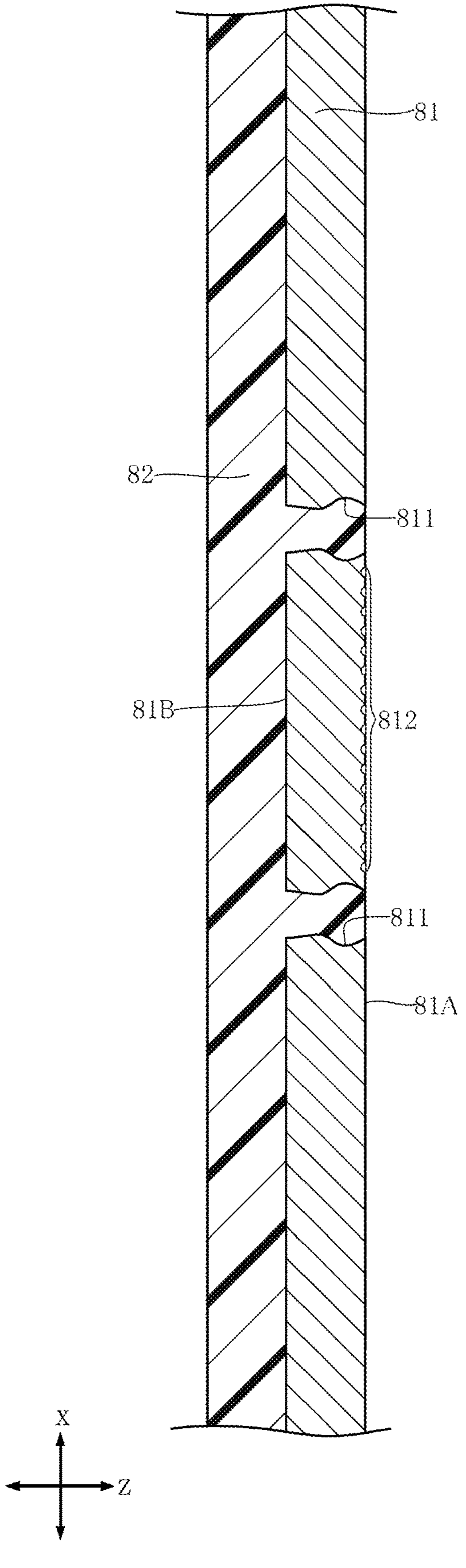
FIG. 12 is a cross-sectional view for describing a manufacturing process of the resistor illustrated in FIG. 1.

As illustrated in FIG. 12, first, a resistive element 81 including a first surface 81A and a second surface 81B facing opposite sides in the thickness direction z is bonded to a base material 82 via thermocompression bonding. The resistive element 81 is formed of a plurality of resistive elements 10 of the resistor A10 contiguous in the first direction x and the second direction y. The first surface 81A corresponds to the first surface 10A of the resistive element 10. The second surface 81B corresponds to the second surface 10B of the resistive element 10. The base material 82 is formed of a plurality of insulating plates 20 of the resistor A10 contiguous in the first direction x and the second direction y. First, a plurality of slits 811 are formed in the resistive element 81 extending from the first surface 10A through to the second surface 81B. The plurality of slits 811 correspond to the first slit 111 and the second slit 112 of the resistive element 10. The plurality of slits 811 are formed via wet etching. Next, the base material 82 is bonded to the second surface 81B via thermocompression bonding using a laminating press. When the base material 82 is bonded to the second surface 81B via thermocompression bonding, a portion of the base material 82 extends through the plurality of slits 811 in the thickness direction z. Lastly, with a probe for measuring the resistance value of the resistive element 81 brought into contact with the first surface 10A, a plurality of grooves 812 recessed from the first surface 10A are formed in the resistive element 81. The plurality of grooves 812 correspond to the plurality of grooves 12 of the resistive element 10. The plurality of grooves 12 are formed via laser irradiation, for example. When the resistance value of the resistive element 81 reaches a predetermined value, the formation of the plurality of grooves 812 ends.

Figure 13:
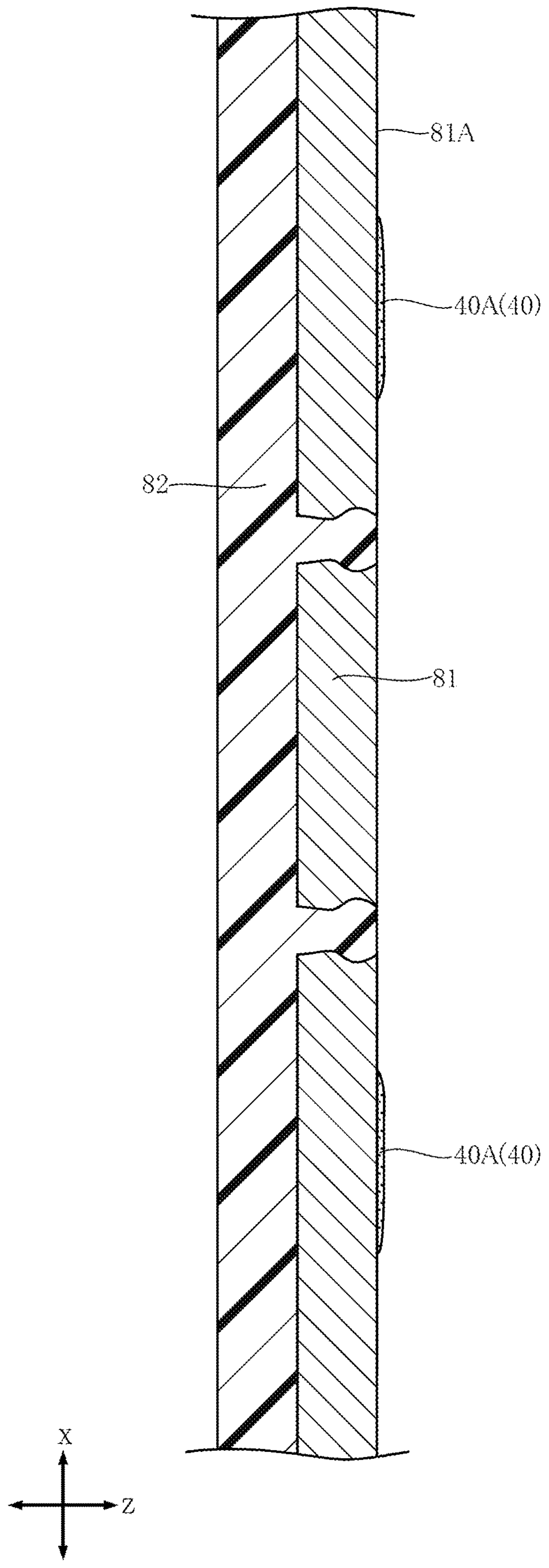
FIG. 13 is a cross-sectional view for describing a manufacturing process of the resistor illustrated in FIG. 1.

Next, as illustrated in FIG. 13, the first layers 40A of the pair of intermediate layers 40 that cover a portion of the first surface 81A of the resistive element 81 are formed. The first layers 40A of the pair of intermediate layers 40 are applied to the first surface 81A by screen printing a material including silver particles and an epoxy resin. Here, the material is applied at positions spaced apart from each other in the first direction x. Then, the material is thermally cured, and the first layers 40A of the pair of intermediate layers 40 are formed.

Figure 14:
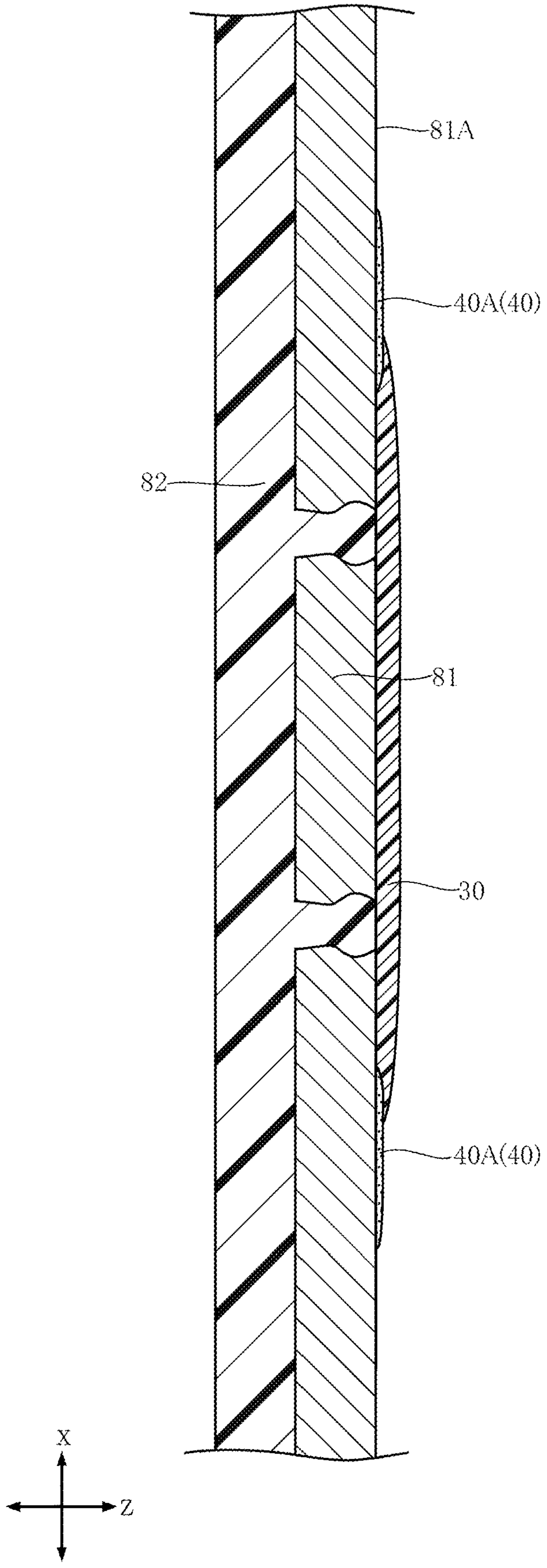
FIG. 14 is a cross-sectional view for describing a manufacturing process of the resistor illustrated in FIG. 1.

Next, as illustrated in FIG. 14, the protective film 30 covering a portion of the first surface 81A of the resistive element 81 and a portion of the base material 82 extending through the plurality of slits 811 of the resistive element 81 is formed. First, a material including an epoxy resin is applied via screen printing to a portion of the first surface 81A so as to completely cover the portion of the base material 82 extending through the plurality of slits 811. Here, each end of the material in the first direction x covers over the first layer 40A of one of the pair of intermediate layers 40. Then, the material is thermally cured, and the protective film 30 is formed.

Figure 15:
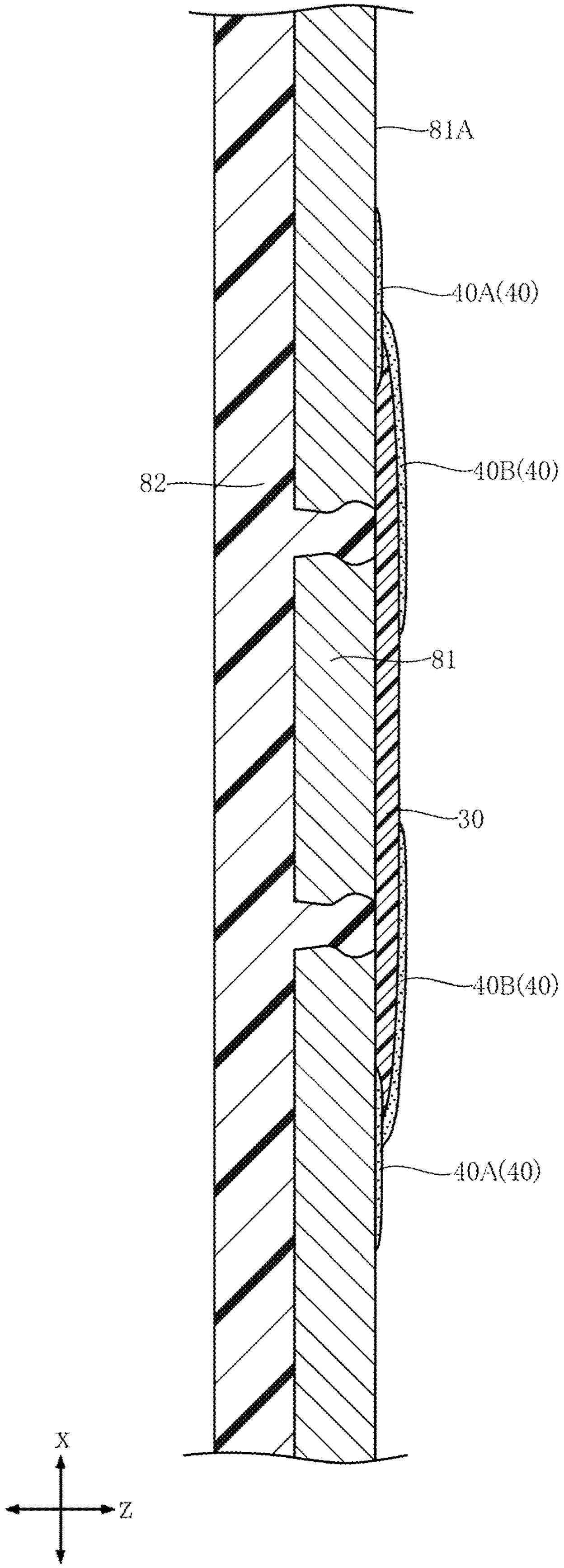
FIG. 15 is a cross-sectional view for describing a manufacturing process of the resistor illustrated in FIG. 1.

Next, as illustrated in FIG. 15, the second layers 40B of the pair of intermediate layers 40 that cover a portion of the protective film 30 are formed. First, a material including silver particles and an epoxy resin are applied to the protective film 30 via screen printing. Here, the material is applied at positions spaced apart from each other in the first direction x. Also, each portion of the material spaced apart from each other is applied so as to cover over a portion of the first layer 40A of one of the pair of intermediate layers 40. Then, the material is thermally cured, and the second layers 40B of the pair of intermediate layers 40 are formed.

Figure 16:
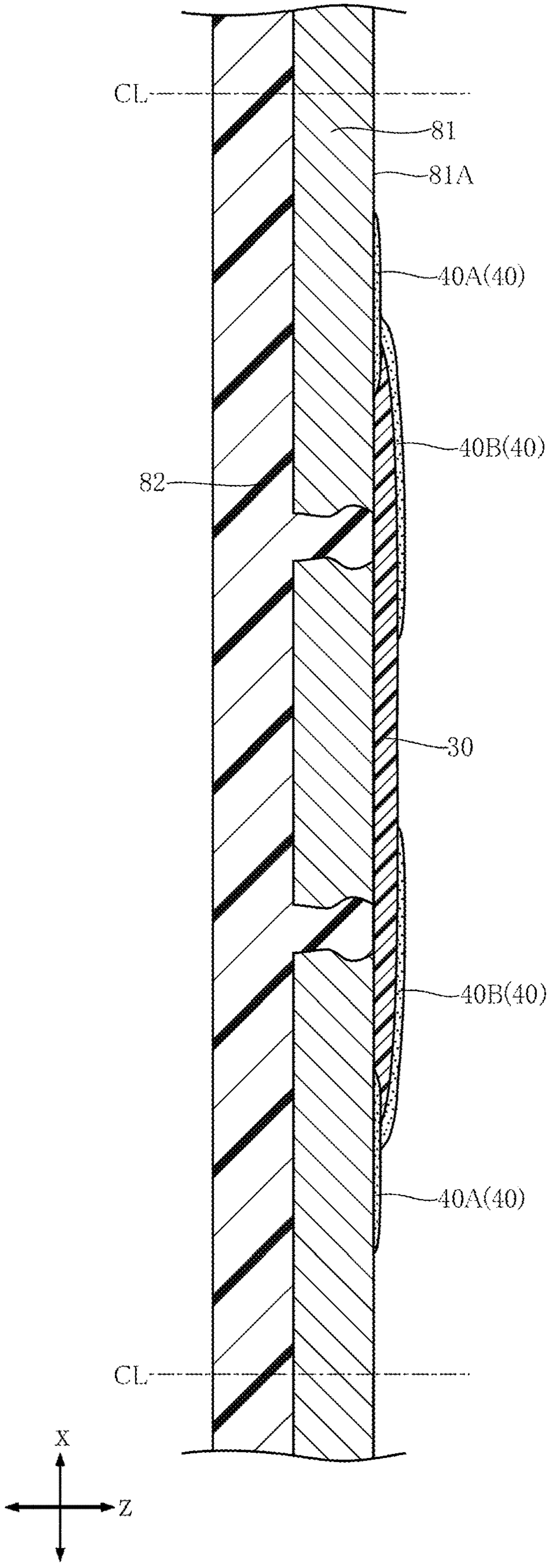
FIG. 16 is a cross-sectional view for describing a manufacturing process of the resistor illustrated in FIG. 1.

Next, as illustrated in FIG. 16, a dicing blade is used to cut the resistive element 81 and the base material 82 along a cutting line CL to divide the resistive element 81 and the base material 82 into a piece including the protective film 30 and the pair of intermediate layers 40 (the first layers 40A and the second layers 40B). This piece corresponds to the component of the resistor A10 minus the pair of electrodes 50. In other words, the resistive element 81 divided into pieces corresponds to the resistive element 10 of the resistor A10. Also, the base material 82 divided into pieces corresponds to the insulating plate 20 of the resistor A10. Note that the pair of first end surfaces 10C of the resistive element 10 correspond to the cut surfaces of the resistive element 81 formed in this process. Also, the pair of end surfaces 20A of the insulating plate 20 correspond to the cut surfaces of the base material 82 formed in this process.

Figure 17:
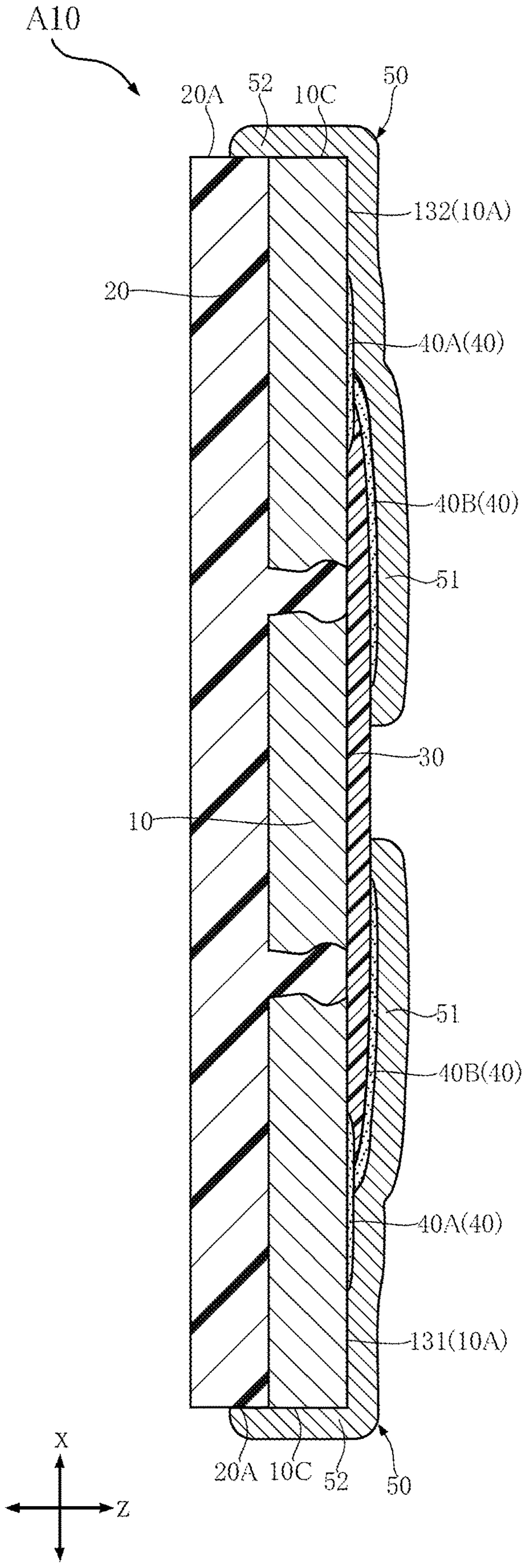
FIG. 17 is a cross-sectional view for describing a manufacturing process of the resistor illustrated in FIG. 1.

Lastly, as illustrated in FIG. 17, the pair of electrodes 50 that come into contact with the resistive element 10 are formed. The pair of electrodes 50 are formed by electrolytic barrel plating of the copper layer, the nickel layer, and the tin layer in this order. Each one of the pair of intermediate layers 40 is covered by the bottom portion 51 of one of the pair of electrodes 50. The bottom portion 51 of each one of the pair of electrodes 50 is in contact with either the first region 131 or the second region 132 of the resistive element 10 and the protective film 30. Also, each one of the pair of first end surfaces 10C of the resistive element 10 and a portion of each one of the pair of end surfaces 20A of the insulating plate 20 are covered by the side portion 52 of one of the pair of electrodes 50. Next, the pair of electrodes 50 are heat treated at a temperature of 170° C. for two hours. In this manner, the bonds between the bottom portions 51 of the pair of electrodes 50 and the resistive element 10 are improved. With the process described above complete, the resistor A10 is manufactured.

Next, the effects of the resistor A10 will be described.

The resistor A10 is provided with the resistive element 10, the protective film 30 disposed on the first surface 10A of the resistive element 10, and the pair of electrodes 50 disposed in contact with the resistive element 10 and spaced apart from each other in the first direction x. The resistive element 10 includes the first slit 111 and the second slit 112. The protective film includes the first outer edge 30A located closest to the first slit 111 and the second outer edge 30B located closest to the second slit 112. In the resistor A10, as viewed in the thickness direction z, the first distance L1 from the first outer edge 30A to the first slit 111 and the second distance L2 from the second outer edge 30B to the second slit 112 together occupy 15% or greater of the dimension L0 of the protective film 30 in the first direction x.

Figure 18:
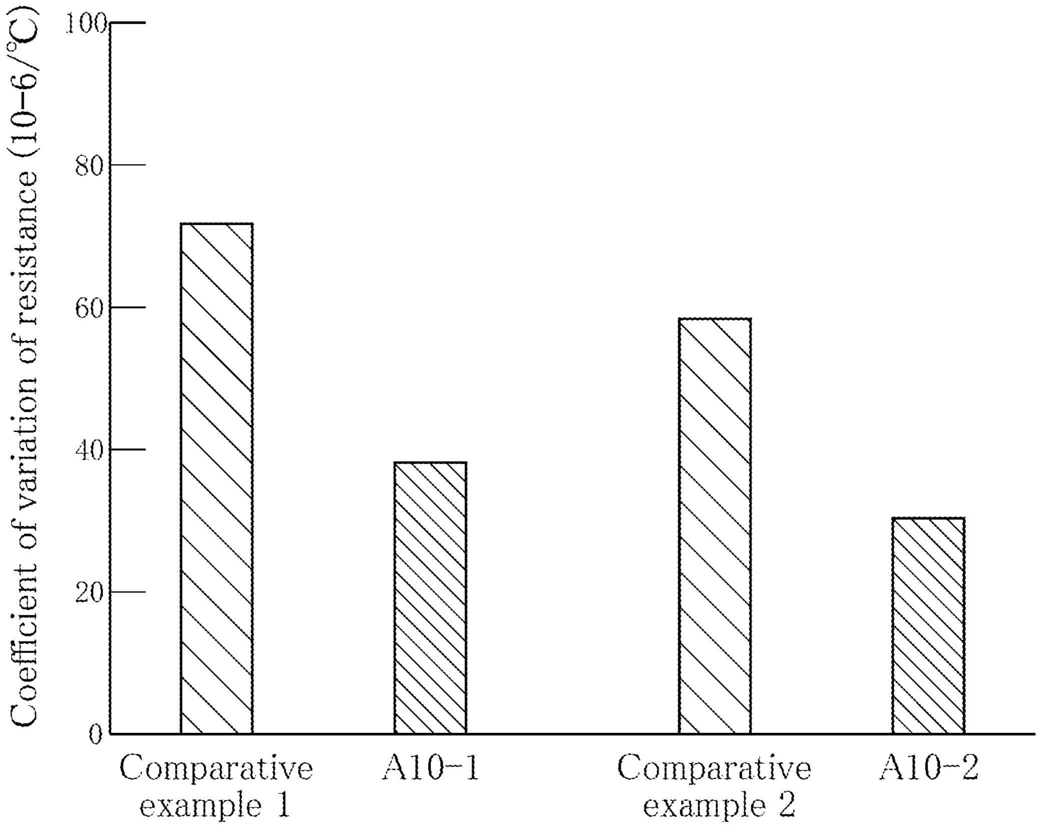
FIG. 18 is a graph showing the temperature coefficient of resistance of the resistor illustrated in FIG. 1 and a resistor of a comparative example.

FIG. 18 is a diagram illustrating the coefficient of variation of resistance (unit: $10^{-6}$/° C.) of the resistor A10 and a resistor of a comparative examples when the temperature of the resistive element 10 varies within a range from 20° C. to 60° C. In comparative example 1 indicated in FIG. 18, the first slit 111 and the second slit 112 have the same length as the first slit 111 and the second slit 112 of the resistor A10-1. In a similar manner, in comparative example 2, the first slit 111 and the second slit 112 have the same length as the first slit 111 and the second slit 112 of the resistor A10-2. In comparative example 1 and comparative example 2, as viewed in the thickness direction z, the first distance L1 from the first outer edge 30A to the first slit 111 and the second distance L2 from the second outer edge 30B to the second slit 112 together occupy less than 15% of the dimension L0 of the protective film 30 in the first direction x.

As illustrated in FIG. 18, the coefficient of variation of resistance of the resistor A10-1 is approximately 50% of the coefficient of variation of resistance of the comparative example 1. In a similar manner, the coefficient of variation of resistance of the resistor A10-2 is approximately 50% of the coefficient of variation of resistance of the comparative example 2. Thus, according to the resistor A10, an increase in the temperature coefficient of resistance can be suppressed.

Also, in the resistor A10, as viewed in the thickness direction z, the first distance L1 from the first outer edge 30A to the first slit 111 and the second distance L2 from the second outer edge 30B to the second slit 112 together occupy 30% or less of the dimension L0 of the protective film 30 in the first direction x. In a case where the distance between the first slit 111 and the second slit 112 is too small, when the resistor A10 is in use, the increase in the temperature of the region of the resistive element 10 between the first slit 111 and the second slit 112 is significant. In this state, variation in the resistance value of the resistor A10 may occur. Thus, with the present configuration, an excessive increase in the temperature of the region of the resistive element 10 between the first slit 111 and the second slit 112 can be prevented, and thus variation of the resistance value of the resistor A10 caused by an increase in the temperature of the resistive element 10 can be suppressed.

In the resistor A10, the first slit 111 overlaps with the bottom portion 51 of one of the pair of electrodes 50 as viewed in the thickness direction z. Also, the second slit 112 overlaps with the bottom portion 51 of the other one of the pair of electrodes 50. In the regions of the resistive element 10 adjacent to the first slit 111 and the second slit 112 in the second direction y, the resistance value increases locally relative to other regions. Thus, when the resistor A10 is in use, the temperature of these regions increases more than other regions. Accordingly, with the present configuration, because the heat generated from these regions is transferred to the pair of bottom portions 51, an excessive increase in the temperature of these regions can be prevented.

The resistive element 10 includes the plurality of grooves 12 recessed from the first surface 10A and extending in a predetermined direction. The protective film 30 meshes with the plurality of grooves 12. In this manner, because an anchoring effect is displayed by the protective film 30 with respect to the resistive element 10, the bond between the resistive element 10 and the protective film 30 can be improved.

The protective film 30 includes the filler 31 made of a material including a ceramic. In this manner, the mechanical strength of the protective film 30 can be increased. Furthermore, a ceramic with a relatively high thermal conductivity such as alumina, boron nitride, or the like can be selected as the ceramic, allowing the protective film 30 to have a high thermal conductivity. In this manner, the heat dissipation of the resistor A10 can be further improved.

The insulating plate 20 is made of a material including a synthetic resin. Accordingly, in the process illustrated in FIG. 11, the base material 82 can be bonded to the second surface 81B of the resistive element 81 via thermocompression bonding using a laminating press. Also, a portion of the insulating plate 20 is disposed extending through the first slit 111 and the second slit 112 in the thickness direction z. In this manner, because an anchoring effect is displayed by the insulating plate 20 with respect to the resistive element 10, the bond between the resistive element 10 and the insulating plate 20 can be improved. Furthermore, the first slit 111 and the second slit 112 each include the pair of side walls 11A separated in the first direction x. Each side wall 11A includes a portion recessed in the first direction x. In this manner, because the anchoring effect displayed by the insulating plate 20 with respect to the resistive element 10 is increased, the bond between the resistive element 10 and the insulating plate 20 can be further improved.

The insulating plate 20 includes the pair of end surfaces 20A facing opposite sides in the first direction x and spaced apart from each other in the first direction x. The side portion 52 of each one of the pair of electrodes 50 is in contact with one of the pair of end surfaces 20A. In this manner, the dimension in the thickness direction z of the side portions 52 of pair of electrodes 50 can be further lengthened. When mounting the resistor A10 on the circuit board, a solder fillet is formed at the side portions 52 of the pair of electrodes 50. Thus, according to the present configuration, because the volume of the solder fillet is larger, the mountability of the resistor A10 on the circuit board is further improved.

The resistor A10 is further provided with the pair of intermediate layers 40 spaced apart from each other in the first direction x and each including the cover portion 41 covering a portion of the protective film 30. The pair of intermediate layers 40 are electrically connected to the resistive element 10. In the resistor A10, the pair of intermediate layers 40 are made of a metal thin film. The cover portion 41 of each one of the pair intermediate layers 40 is located between the protective film 30 and the bottom portion 51 of one of the pair of electrodes 50. In this manner, in the process illustrated in FIG. 16, the bottom portions 51 of the pair of electrodes 50 covering a portion of the protective film 30 can be formed via electrolytic barrel plating.

The first outer edge 30A and the second outer edge 30B of the protective film 30 are located between the pair of first end surfaces 10C of the resistive element 10 as viewed in the thickness direction z. The first surface 10A of the resistive element 10 includes the first region 131 and the second region 132 not covered by the protective film 30 or the pair of intermediate layers 40. The first region 131 and the second region 132 are each in contact with the bottom portion 51 of one of the pair of electrodes 50. In this manner, when the resistor A10 is in use, the current running through the resistive element 10 is made easier to run from the first region 131 and the second region 132 to the bottom portions 51 of the pair of electrodes 50. Thus, because the length of the current path in the resistor A10 is shortened, the variance of the resistance value of the resistor A10 can be suppressed.

The resistive element 10 includes the projections 14 projecting in the second direction y from one of the pair of second end surfaces 10D. Each one of the projections 14 is connected to one of the pair of first end surfaces 10C. In this manner, in the process illustrated in FIG. 15, the cutting line CL can be set with the projections 14 as the target. Also, the area of the first region 131 or the second region 132 of the resistive element 10 can be increased via the projections 14. In this manner, the bonds between the bottom portion 51 of one of the pair of electrodes 50 and the resistive element 10 can be improved. In forming the pair of electrodes 50 by electrolytic barrel plating via the process illustrated in FIG. 16, the bonding is improved, thus making it less likely that the bottom portion 51 of either one of the pair of electrodes 50 is defective.

The shape of the resistive element 10 has point symmetry as viewed in the thickness direction z. Thus, the resistance value of the resistor A10 is constant irrespective of the polarity of the pair of electrodes 50. Accordingly, it is not necessary to check the polarity of the pair of electrodes 50 when mounting the resistor A10 on the circuit board.

In the resistor A10, the pair of intermediate layers 40 are made of a material including a synthetic resin including metal particles. Accordingly, the protective film 30 and the pair of intermediate layers 40 have a configuration including the same type of material. This allows the bond between the protective film 30 and the cover portions 41 of the pair of intermediate layers 40 can be improved. Also, because the physical properties of the pair of intermediate layers 40 includes electrical conductivity, the pair of intermediate layers 40 can be electrical conductive with the resistive element 10.

In the resistor A10, the electric resistivity of the pair of intermediate layers 40 is greater than the electric resistivity of the resistive element 10. Thus, when the resistor A10 is in use, the current running through the resistive element 10 is made more difficult to run to the pair of intermediate layers 40. Accordingly, variation of the resistance value of the resistor A10 due to the effects of the pair of intermediate layers 40 can be suppressed.

Figure 19:
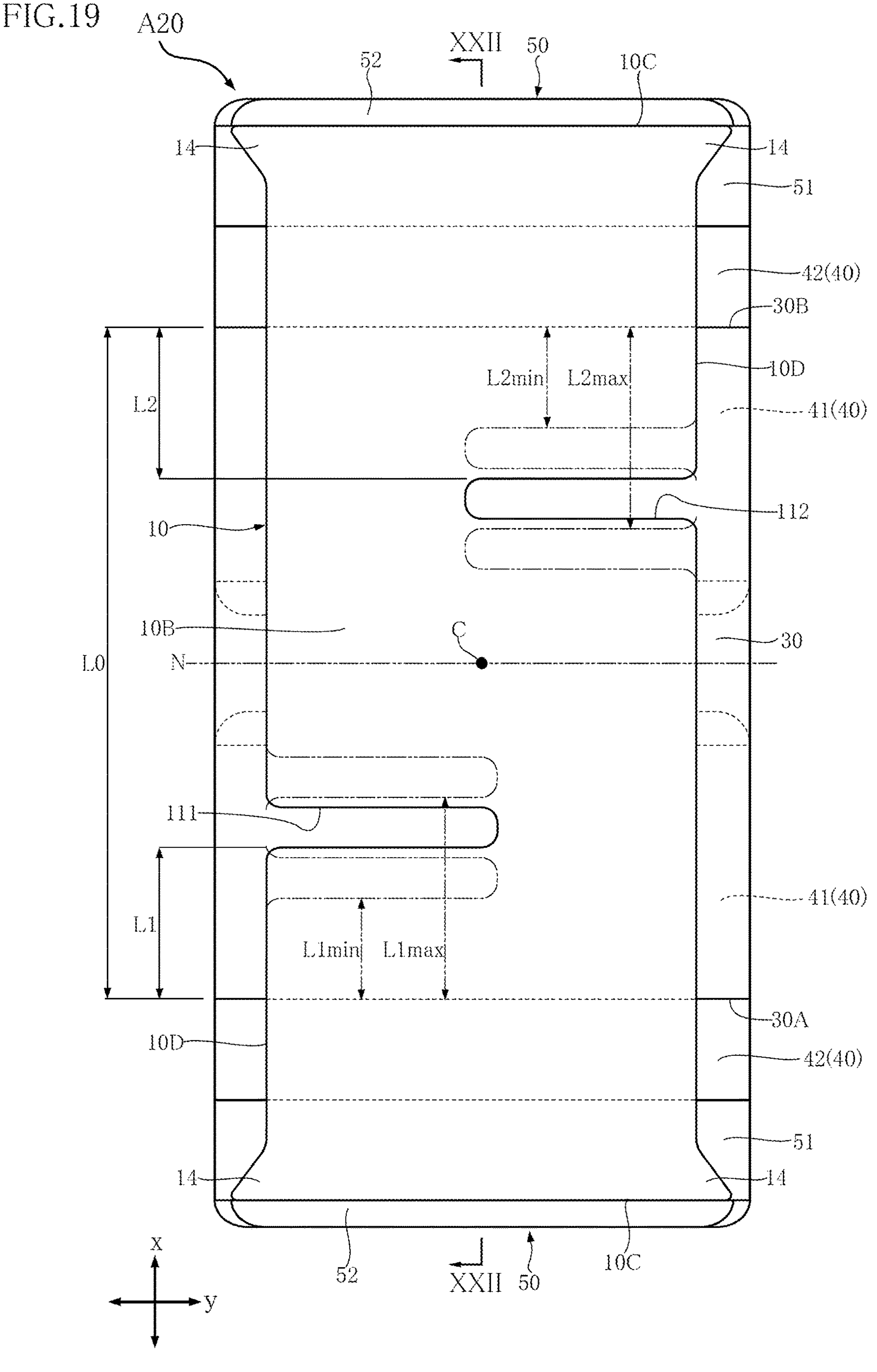
FIG. 19 is a plan view of a resistor according to a second embodiment, with the insulating plate made transparent.
Figure 20:
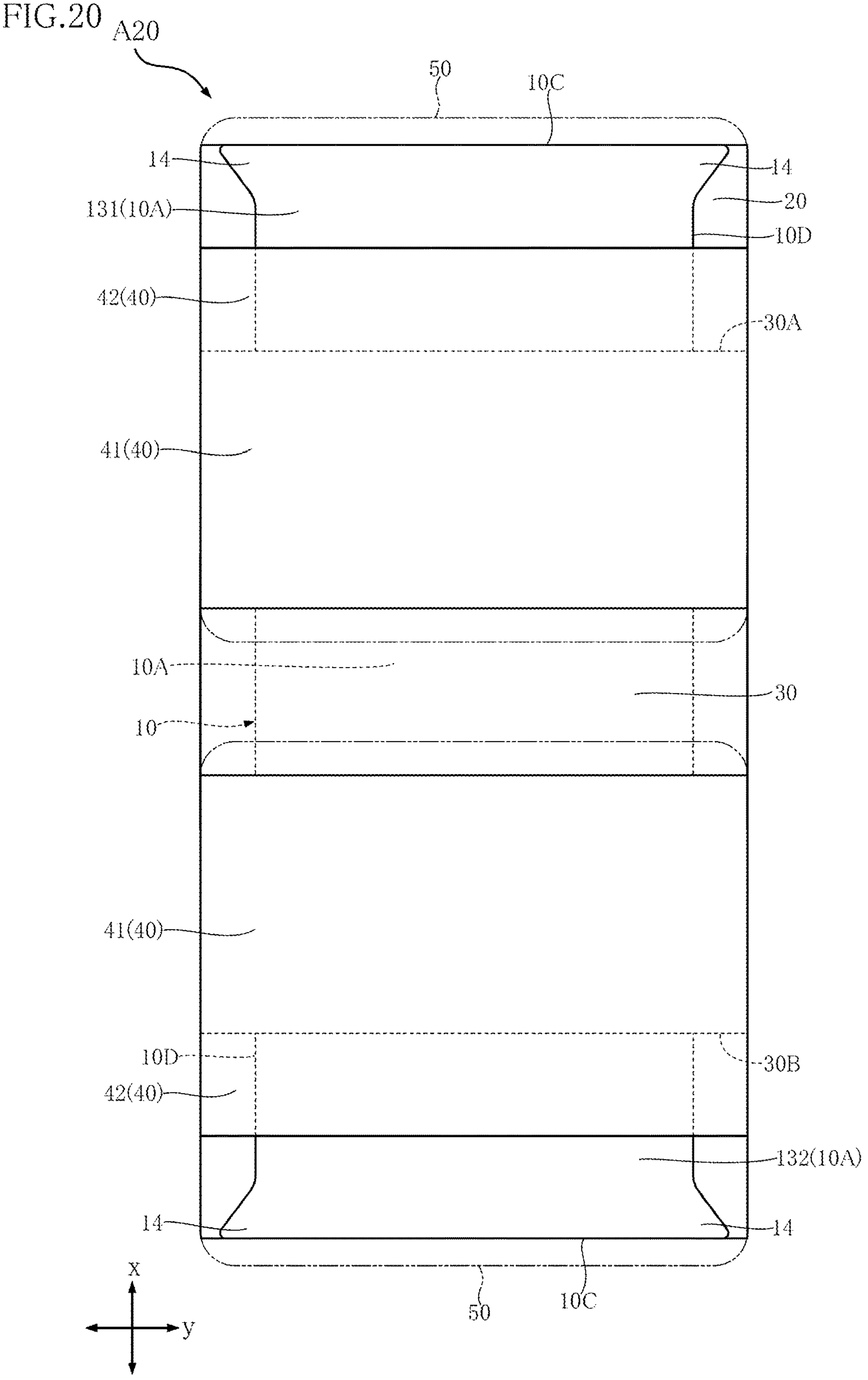
FIG. 20 is a bottom view of the resistor illustrated in FIG. 19, with the pair of electrodes made transparent.
Figure 21:
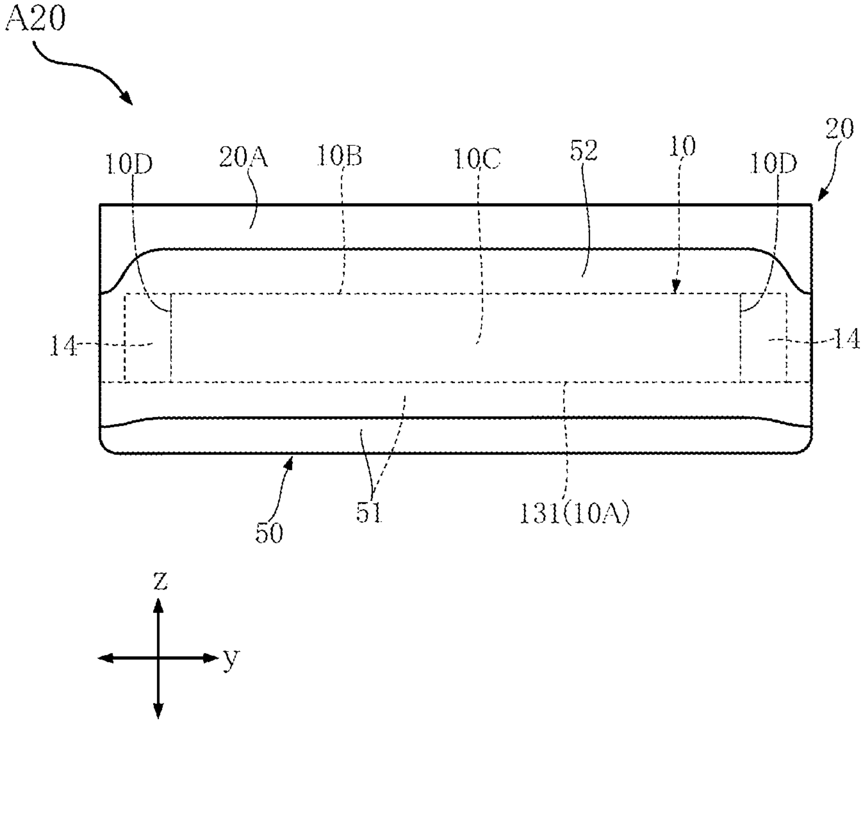
FIG. 21 is a front view of the resistor illustrated in FIG. 19.

The resistor A20 according to a second embodiment will now be described with reference to FIGS. 19 to 22. In these diagrams, elements the same or similar to those of the resistor A10 described above are given the same reference sign, and redundant descriptions are omitted. Note that in FIG. 19, the insulating plate 20 is shown as being transparent. In FIG. 20, the pair of electrodes 50 are shown as being transparent. In FIG. 20, the transparent pair of electrodes 50 are indicated by an imaginary line.

The resistor A20 has a different configuration to the resistor A10 described above in terms of the configuration of the pair of intermediate layers 40.

Figure 22:
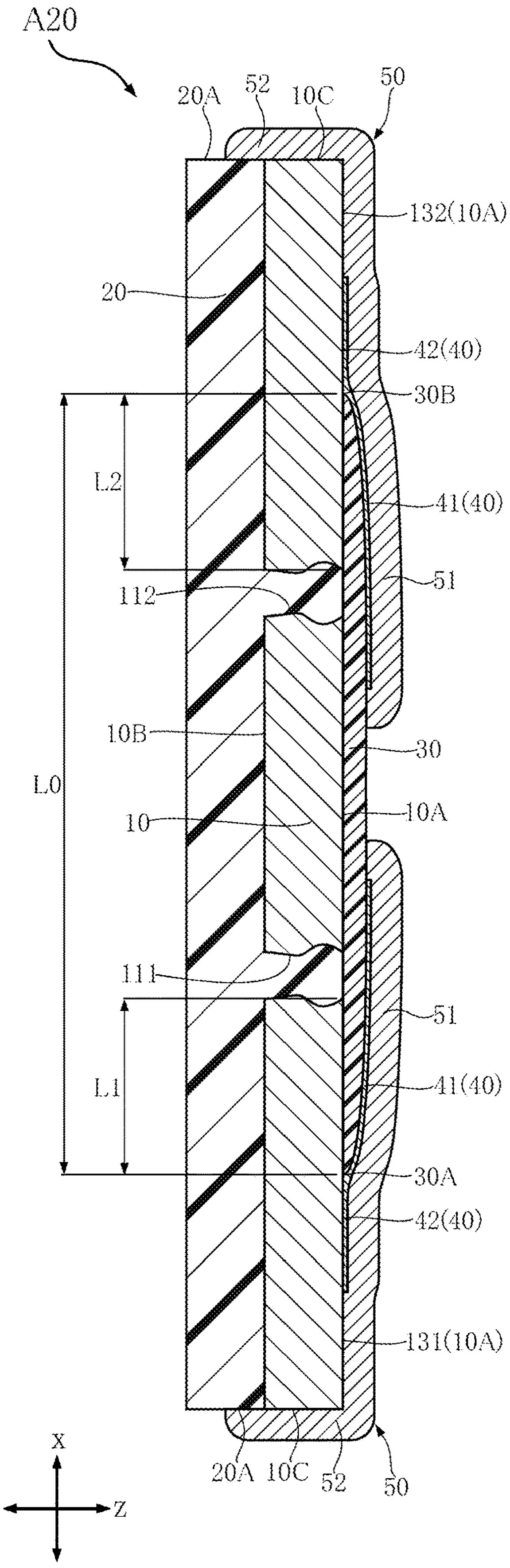
FIG. 22 is a cross-sectional view taken along line XXII-XXII of FIG. 19.

In the resistor A20, the pair of intermediate layers 40 are made of a metal thin film. The metal thin film is made of a nickel-chromium (Cr) alloy, for example. As illustrated in FIGS. 19, 20, and 22, each one of the pair of intermediate layers 40 includes the cover portion 41 and the extension portion 42. The cover portion 41 is located on the opposite side of the protective film 30 to the resistive element 10 in the thickness direction z. The cover portion 41 covers a portion of the protective film 30. The extension portion 42 extends from one of the cover portions 41 of the pair of intermediate layers 40 towards one of the pair of first end surfaces 10C of the resistive element 10. The extension portion 42 is in contact with the first surface 10A of the resistive element 10. In this manner, the pair of intermediate layers 40 are electrically connected to the resistive element 10. Note that in the resistor A20, each one of the pair of intermediate layers 40 does not include the first layer 40A and the second layer 40B. Accordingly, each one of the pair of intermediate layers 40 are an integral member.

Next, an example of a method of manufacturing the resistor A20 will be described with reference to FIGS. 12, 16, 17, and 23 to 25. Note that the cross-section location illustrated in FIGS. 23 to 25 is the same as the cross-section location illustrated in FIG. 22.

As illustrated in FIG. 12, first, the resistive element 81 including the first surface 81A and the second surface 81B facing opposite sides in the thickness direction z is bonded to the base material 82 via thermocompression bonding. Note that the present process is the same as the process in the method of manufacturing the resistor A10, and thus description thereof will be omitted.

Figure 23:
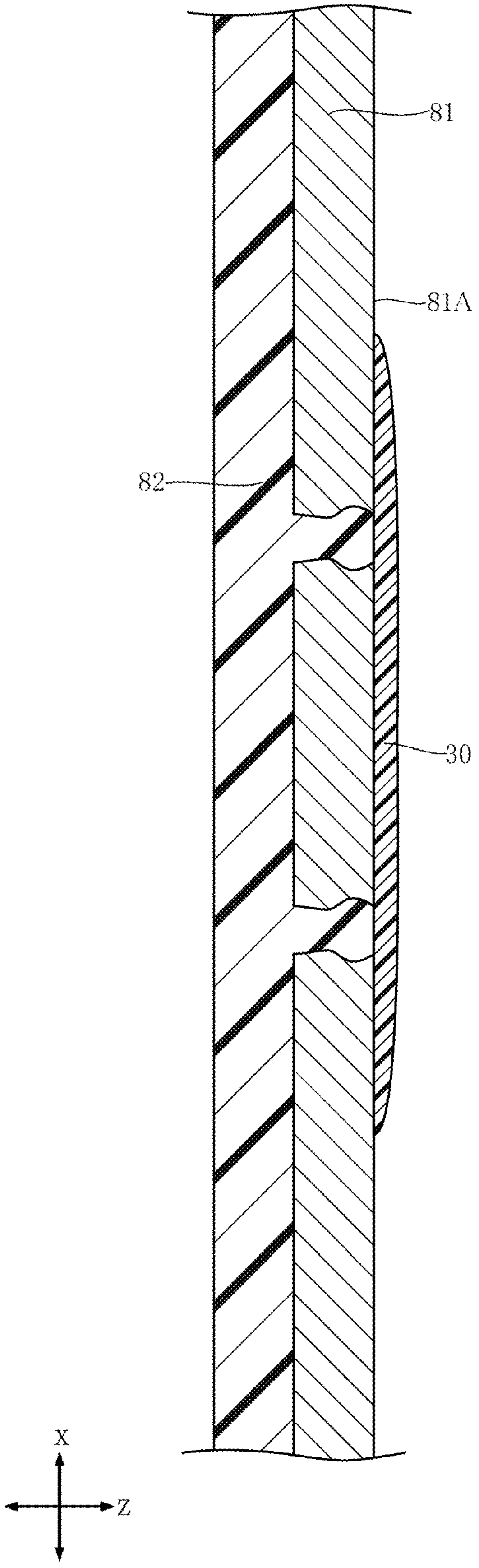
FIG. 23 is a cross-sectional view for describing a manufacturing process of the resistor illustrated in FIG. 19.

Next, as illustrated in FIG. 23, the protective film 30 covering a portion of the first surface 81A of the resistive element 81 and a portion of the base material 82 extending through the plurality of slits 811 of the resistive element 81 is formed. A material including an epoxy resin is applied via screen printing to a portion of the first surface 81A so as to completely cover the portion of the base material 82 entering through the plurality of slits 811, and then the material is thermally cured to form the protective film 30.

Figure 24:
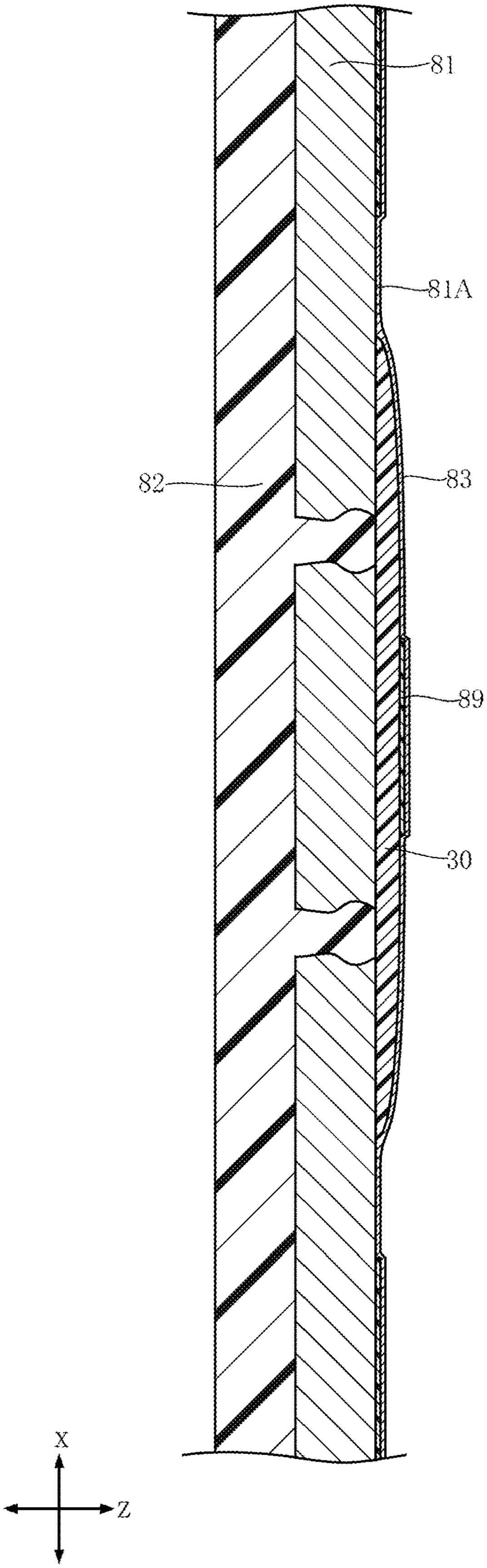
FIG. 24 is a cross-sectional view for describing a manufacturing process of the resistor illustrated in FIG. 19.
Figure 25:
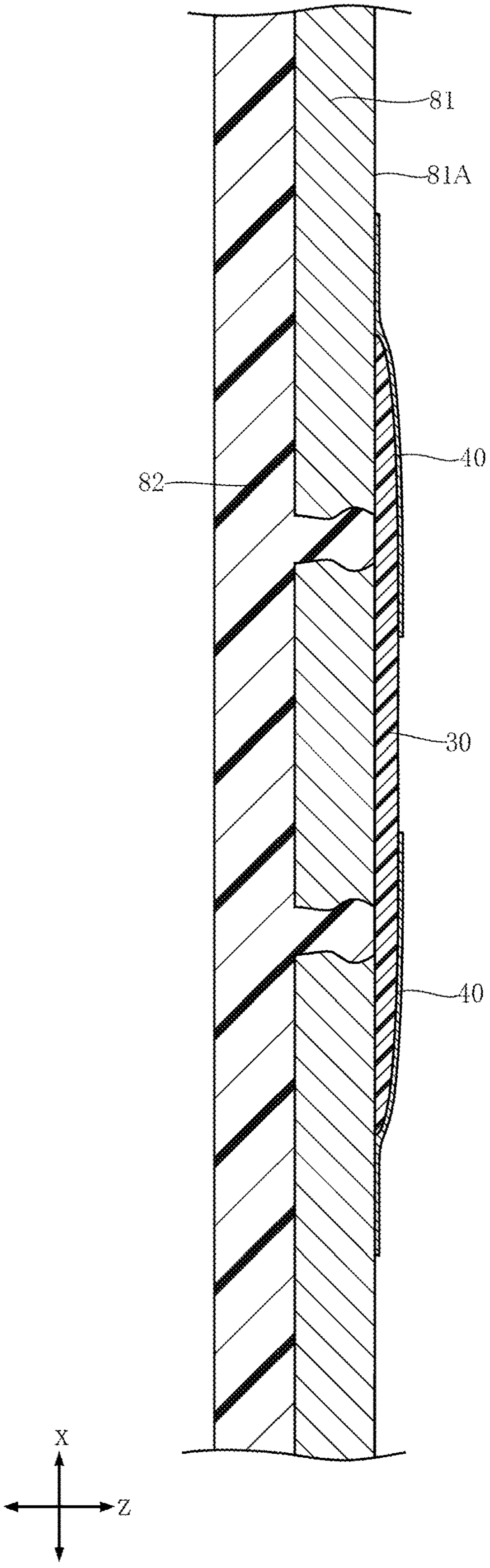
FIG. 25 is a cross-sectional view for describing a manufacturing process of the resistor illustrated in FIG. 19.

Next, as illustrated in FIG. 24, a metal thin film 83 is formed overlapping with the entire first surface 81A of the resistive element 81 and the entire protective film 30 as viewed in the direction y. To form the metal thin film 83, first, a mask layer 89 is formed covering a portion of the first surface 81A of the resistive element 81 and a portion of the protective film 30. The mask layer 89 is formed via screen printing. After the mask layer 89 is formed, the metal thin film 83 is formed. The metal thin film 83 is made of a nickel-chromium alloy. The metal thin film 83 is formed via a sputtering method. In the present process, the entire mask layer 89 is covered by the metal thin film 83.

Next, as illustrated in FIG. 25, the mask layer 89 and a portion of the metal thin film 83 covering the mask layer 89 are removed (lift off). In the present process, the pair of intermediate layers 40 are formed covering a portion of the first surface 81A of the resistive element 81 and a portion of the protective film 30. In other words, the pair of intermediate layers 40 are formed from the metal thin film 83 remaining on the protective film 30 and the like.

Next, as illustrated in FIG. 16, a dicing blade is used to cut the resistive element 81 and the base material 82 along the cutting line CL to divide the resistive element 81 and the base material 82 into a piece including the protective film 30 and the pair of intermediate layers 40. Note that the present process is the same as the process in the method of manufacturing the resistor A10, and thus description thereof will be omitted.

Lastly, as illustrated in FIG. 17, the pair of electrodes 50 that come into contact with the resistive element 10 are formed. Note that the present process is the same as the process in the method of manufacturing the resistor A10, and thus description thereof will be omitted. With the process described above complete, the resistor A20 is manufactured.

Next, the effects of the resistor A20 will be described.

The resistor A20 is provided with the resistive element 10, the protective film 30 disposed on the first surface 10A of the resistive element 10, and the pair of electrodes 50 disposed in contact with the resistive element 10 and spaced apart from each other in the first direction x. The resistive element 10 includes the first slit 111 and the second slit 112. The protective film 30 includes the first outer edge 30A located closest to the first slit 111 and the second outer edge 30B located closest to the second slit 112. In the resistor A10, as viewed in the thickness direction z, the first distance L1 from the first outer edge 30A to the first slit 111 and the second distance L2 from the second outer edge 30B to the second slit 112 together occupy 15% or greater of the dimension L0 of the protective film 30 in the first direction x. Thus, also according to the resistor A20, an increase in the temperature coefficient of resistance can be suppressed.

The present disclosure is not limited to the embodiments described above. Also, variation design modifications can be made to the specific configurations of the various components in these embodiments.

REFERENCE NUMERALS

A10, A20 Resistor
10 Resistive element
10A First surface
10B Second surface
10C First end surface
10D Second end surface
111 First slit
112 Second slit
11A Side wall
12 Groove
131 First region
132 Second region
14 Projection
20 Insulating plate
20A End surface
30 Protective film
30A First outer edge
30B Second outer edge
31 Filler
40 Intermediate layer
40A First layer
40B Second layer
41 Cover portion
42 Extension portion
421 Cutout
43 Interposed portion
50 Electrode
51 Bottom portion
52 Side portion
81 Resistive element
81A First surface
81B Second surface
811 Slit
812 Groove
82 Base material
83 Metal thin film
89 Mask layer
L1, L1min, L1max First distance
L2, L2min, L2max Second distance
L0 Dimension
C Center
N Boundary
Bmin, bmax Width CL Cutting line
z Thickness direction
x First direction
y Second direction

The invention claimed is:

1. A resistor, comprising:

a resistive element including a first surface and a second surface facing opposite sides in a thickness direction;

a protective film disposed on the first surface and having electrical insulating properties;

a pair of electrodes spaced apart from each other in a first direction perpendicular to the thickness direction, the pair of electrodes being held in contact with the resistive element; and an insulating plate disposed on the second surface and made of a material including a synthetic resin, wherein the protective film includes a first outer edge and a second outer edge that are spaced apart from each other in the first direction and each extend in a second direction perpendicular to the thickness direction and the first direction;

the resistive element includes a first slit and a second slit each extending from the first surface through to the second surface and extending in the second direction;

the first slit is located closest to the first outer edge;

the second slit is located closest to the second outer edge; and as viewed in the thickness direction, a minimum distance between the pair of electrodes is smaller than each of a first distance between the first outer edge and the first slit and a second distance between the second outer edge and the second slit, wherein the insulating plate includes a portion extending into the first slit and the second slit in the thickness direction.

2. The resistor according to claim 1 wherein as viewed in the thickness direction, the first distance and the second distance are equal to each other.

3. The resistor according to claim 2, wherein each one of the pair of electrodes includes a bottom portion opposite to the resistive element with respect to the protective film in the thickness direction; and the bottom portion of each one of the pair of electrodes includes a portion overlapping with a portion of the protective film as viewed in the thickness direction.

4. The resistor according to claim 3, wherein the protective film is made of a material including a synthetic resin.

5. The resistor according to claim 4, wherein the protective film includes a filler made of a material including a ceramic.

6. The resistor according to claim 3, wherein the first slit overlaps with the bottom portion of one of the pair of electrodes as viewed in the thickness direction; and the second slit overlaps with the bottom portion of the other one of the pair of electrodes as viewed in the thickness direction.

7. The resistor according to claim 6, wherein as viewed in the thickness direction, the first distance and the second distance together have a length 30% or less of a dimension of the protective film in the first direction.

8. The resistor according to claim 3, wherein the resistive element includes a pair of first end surfaces spaced apart from each other in the first direction and connected to both the first surface and the second surface;

each one of the pair of electrodes includes a side portion jutting out in the thickness direction and connected to the bottom portion of one of the pair of electrodes; and the side portion of each one of the pair of electrodes is in contact with one of the pair of first end surfaces.

9. The resistor according to claim 8, wherein the resistive element includes a pair of second end surfaces that are connected to the first surface and the second surface and spaced apart from each other in the second direction; and the pair of second end surfaces are covered by the insulating plate.

10. The resistor according to claim 9, wherein each of the side portions of the pair of electrodes is in contact with the insulating plate.

11. The resistor according to claim 9, wherein the first slit extends in the second direction from one surface of the pair of second end surfaces; and the second slit extends in the second direction from the other surface of the pair of second end surfaces.

12. The resistor according to claim 9, wherein the resistive element includes a projection projecting in the second direction from one of the pair of second end surfaces;

the projection is connected to one of the pair of first end surfaces; and the bottom portion of one of the pair of electrodes is in contact with the projection.

13. The resistor according to claim 8, wherein the resistive element includes a plurality of grooves recessed in the first surface and each extending in a predetermined direction; and the protective film meshes with the plurality of grooves.

14. The resistor according to claim 8, further comprising a pair of intermediate layers located between the resistive element and the bottom portion of the pair of electrodes in the thickness direction, wherein each one of the pair of intermediate layers includes a cover portion covering a portion of the protective film; and the bottom portion of each one of the pair of electrodes is in contact with the cover portion of one of the pair of intermediate layers.

15. The resistor according to claim 14, wherein the first outer edge and the second outer edge are located between the pair of first end surfaces as viewed in the thickness direction;

the first surface includes a first region and a second region not covered by any one of the protective film and the pair of intermediate layers;

the first region is located between the first outer edge and one of the pair of first end surfaces located closest to the first outer edge;

the second region is located between the second outer edge and one of the pair of first end surfaces located closest to the second outer edge; and each of the first region and the second region is in contact with the bottom portion of one of the pair of electrodes.

16. The resistor according to claim 1, wherein each of the first slit and the second slit includes a pair of side walls spaced apart from each other in the first direction; and each one of the pair of side walls includes a portion recessed in the first direction.

* * * * *